(12) United States Patent
Tani et al.

(10) Patent No.: US 8,675,213 B2
(45) Date of Patent: Mar. 18, 2014

(54) IMAGE FORMING APPARATUS INCLUDING ENHANCED IMAGE DISPLAY CONTROL DEVICE

(75) Inventors: Takeshi Tani, Osaka (JP); Makoto Okumura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 304 days.

(21) Appl. No.: 13/220,885

(22) Filed: Aug. 30, 2011

(65) Prior Publication Data
US 2012/0075650 A1  Mar. 29, 2012

(30) Foreign Application Priority Data
Sep. 24, 2010 (JP) ................................. 2010-214150

(51) Int. Cl.
*G06F 3/12* (2006.01)
(52) U.S. Cl.
USPC .......................... 358/1.13; 358/1.16; 358/442
(58) Field of Classification Search
USPC ........ 358/1.1, 1.9, 1.13, 1.16, 1.17, 400, 401, 358/442, 448, 296, 527
See application file for complete search history.

(56) References Cited

U.S. PATENT DOCUMENTS

| | | | |
|---|---|---|---|
| 7,576,873 B2 | 8/2009 | Kurohata et al. | |
| 8,035,844 B2 | 10/2011 | Kurohata et al. | |
| 2004/0174551 A1 | 9/2004 | Kurohata et al. | |
| 2008/0137140 A1 | 6/2008 | Kurohata et al. | |
| 2008/0292352 A1 | 11/2008 | Kurohata et al. | |
| 2012/0050776 A1* | 3/2012 | Fukumoto et al. | ........... 358/1.13 |

FOREIGN PATENT DOCUMENTS

| | | |
|---|---|---|
| JP | 2004-287411 A | 10/2004 |
| JP | 2005-077523 | 3/2005 |
| JP | 2008-306469 | 12/2008 |

* cited by examiner

*Primary Examiner* — Thomas D Lee
(74) *Attorney, Agent, or Firm* — Renner, Otto, Boisselle & Sklar, LLP

(57) ABSTRACT

An image forming apparatus includes a document reader, a storage for storing image data, an image output unit and a control unit. The control unit includes: a function setup controller for setting up the image output conditions of output images; a display image generator generating a display image based on image data, a display panel and a control-unit side controller having a function of displaying the display image based on the image data, in preview representation on the display panel. The function setup controller includes an image data sheaf forming function, a section break setup function, an image output condition storing function and an image output executing function.

6 Claims, 15 Drawing Sheets

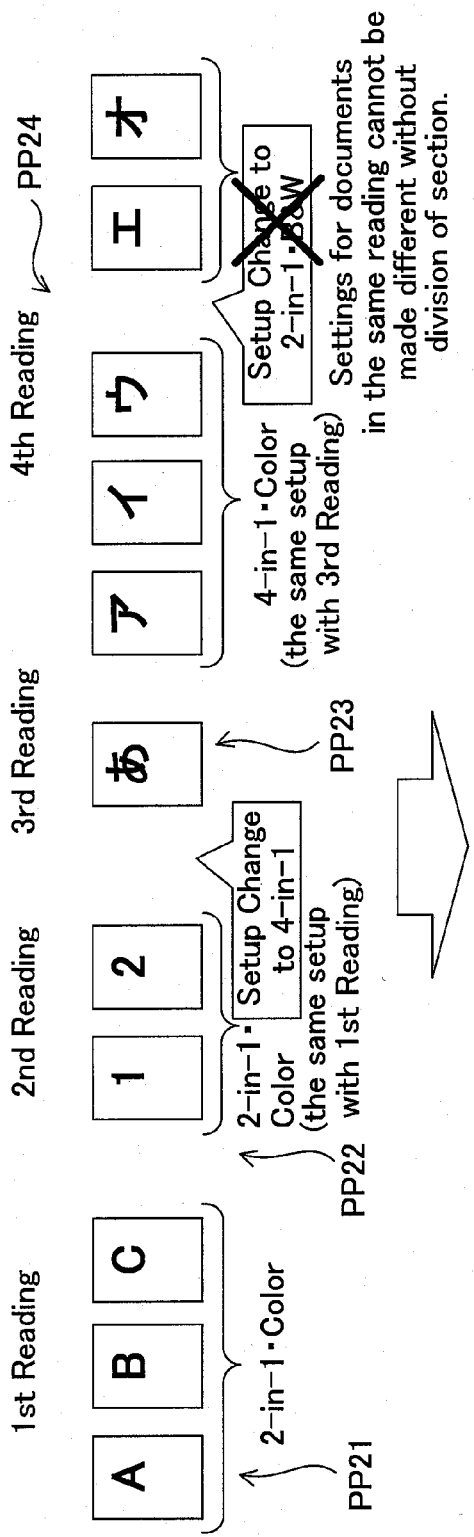
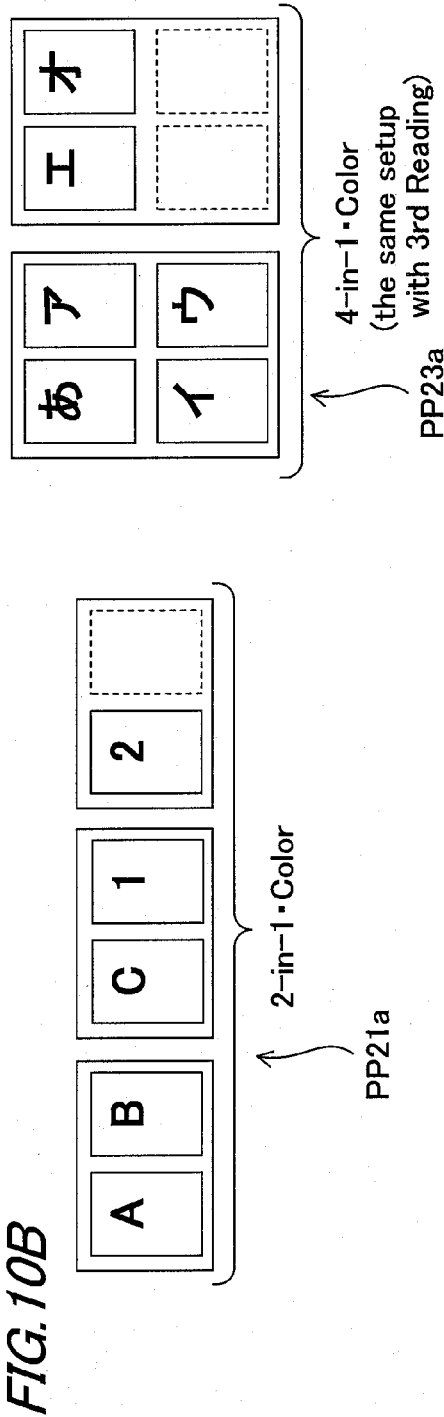
FIG.10A
FIG.10B

IMAGE FORMING APPARATUS INCLUDING ENHANCED IMAGE DISPLAY CONTROL DEVICE

This Nonprovisional application claims priority under 35 U.S.C. §119 (a) on Patent Application No. 2010-214150 filed in Japan on 24 Sep. 2010, the entire contents of which are hereby incorporated by reference.

BACKGROUND OF THE INVENTION (1) Field of the Invention

The present invention relates to an image forming apparatus such as a copier, printer, facsimile machine or the like, in particular, relating to an image forming apparatus having a function of setting up the image output conditions of images to be output based on input image data.

(2) Description of the Prior Art

Recently, there have been known image forming apparatus that include an input means having a function of receiving additional input of image data and an output means performing image output based on the image data input through the input means, and have a function of setting up the image output conditions of the images to be output by the output means. In such an image forming apparatus, it is possible to simply set up and/or change the image output conditions of images to be output before execution of the job.

As a prior art, there has been disclosed an, image forming apparatus having a function of reading documents several times (for example, continuous reading and copying function), in which the display screen is switched from the preview of the currently displayed document sheaf to the preview of the document sheaf that has been scanned before or after the current one, by operating the forward jump button or backward jump button (see Patent Document 1).

Here, the continuous reading and copying function means a function in which when documents are scanned by using an automatic document feeder, images of documents, which have been set and scanned multiple times by the automatic document feeder, are output collectively.

In general, when the continuous reading and copying function is used, the continuous reading mode is set up as the operation mode. Then, a document or a multiple number of documents are set and the start key is pressed so as to perform reading of the set documents. When the reading of the set documents has been completed, another set of documents is placed and the start key is pressed. This process is repeated.

When reading of all the documents has been completed in the above way, the continuous reading end key is pressed. When the continuous reading end key is pressed, printing of the scanned images is started.

According to the above-described image forming apparatus, when document images have been captured by the continuous reading and copying function, it is possible to switch the preview display from the currently displayed document sheaf to the document sheaf that has been read previously or subsequently, by operating the forward jump button or backward jump button.

PRIOR ART DOCUMENTS

Patent Document 1

Japanese Patent Application Laid-open 2008-306469

However, the technology in Patent Document 1 only discloses the continuous reading and copying function when documents are continuously scanned multiple times, whereas there is no reference to change the setup of image output conditions for image forming at and after the second reading, such as one-sided or dual-sided printing, 2-in-1 printing (two pages on one sheet), color printing or monochrome printing and others. Therefore, there has been the problem that if the user wants to divide multiple pages of documents into parts and wants to process each of the divided documents in a different manner (e.g., in a complex combination of document finishing processes), it is impossible to deal with such a situation.

SUMMARY OF THE INVENTION

The present invention has been devised in view of the above prior art problems, it is therefore an object of the present invention to provide an image forming apparatus that continuously scans image data of documents and the like, multiple times and can deal with complex combinations of document finishing processes the user wants.

The first aspect of the invention resides in an image forming apparatus comprising:

an input unit having a function of receiving additional input of image data;

a storing unit storing the image data input from the input unit;

an output unit for performing image output based on the image data stored in storing unit; and, an image display control device, wherein the image display control device includes:

a function setup controller having a function of setting up image output conditions of an image to be output from the output unit;

a display image generator generating a display image based on the image data stored in the storing unit;

a display unit having a display screen for displaying the display image generated by the display image generator; and a display controller having a function of displaying the display image on the display unit in preview representation, the function setup controller includes:

an image data sheaf forming function of forming a plurality of image data sheaves by additionally inputting the image data multiple times;

a section break setup function that, when the image data is additionally input, sets up a section break for creating a section to distinguish the additional input image data to be additionally input, from the precedent image data that has been input already;

an image output condition storing function for storing image output conditions set for each of the sections; and, an image output executing function of performing image output in accordance with the setup of image output conditions for each section.

The second aspect of the present invention resides in that the section break setup function includes a section timing setup function for setting up the section break so that the section break may be executed at an arbitrary timing when the image data is additionally input.

The third aspect of the present invention resides in that the section break setup function includes a section position setup function for setting up the section break at an arbitrary position in the array of image data stored in the order of input.

The fourth aspect of the present invention resides in that the function setup controller includes an intra-section image output condition reconfiguring function of enabling setup change of the image output conditions that have been set at an arbitrary position in the array of image data inside a section divided by the section breaks, and an intra-section reconfiguration validating function of making the setup change of image output conditions effective inside the whole section.

The fifth aspect of the present invention resides in that the function setup controller enables all the functions which the function setup controller has, to be set up when the image output conditions are specified.

The sixth aspect of the present invention resides in that the function setup controller includes a section break canceling function capable of canceling a section break arbitrarily.

The seventh aspect of the present invention resides in that the function setup controller includes a finishing process setup function of setting up a finishing process such as, for example, stapling/punching, page allocation and the like, and the finishing process can be specified with the same settings for multiple sections.

According to the first aspect of the present invention, it is possible to realize an image forming apparatus which, when the apparatus continuously scan documents etc., multiple times and even when the user wants to have the output documents completed in a complex combination of finishing processes, can execute the processes the user wants and satisfy the user need.

According to the second aspect of the present invention, it is possible to divide the documents obtained by a single scanning into sections, divide the documents obtained by a multiple number of scanning into sections at an arbitrary scan timing, and further perform section dividing in combination of these two.

According to the third aspect of the present invention, it is possible to divide multiple pieces of input image data into sections at an arbitrary position.

According to the fourth aspect of the present invention, whenever function setup is performed, it is possible to make the settings effective within the same section.

According to the fifth aspect of the present invention, it is possible to specify settings for all the functions without any restrictions even when settings are specified for every section.

According to the sixth aspect of the present invention, it is possible to arbitrarily edit the set position of a section break.

According to the seventh aspect of the present invention, a setting that exerts over multiple sections can be specified all at once for the multiple sections to thereby finish the output as a single recorded material, it is hence possible to complete the documents in a complex combination of the finishing processes the user wants.

BRIEF DESCRIPTION OF THE DRAWINGS

FIG. 10A is an illustrative view showing a state where the setup of image output conditions is changed at the time of additional reading in normal mode in the image forming apparatus;

FIG. 10B is an illustrative view showing an image output state in normal mode.

DESCRIPTION OF THE PREFERRED EMBODIMENTS

The embodiment of the present invention will hereinafter be described with reference to the accompanying drawings.

Figure 1:
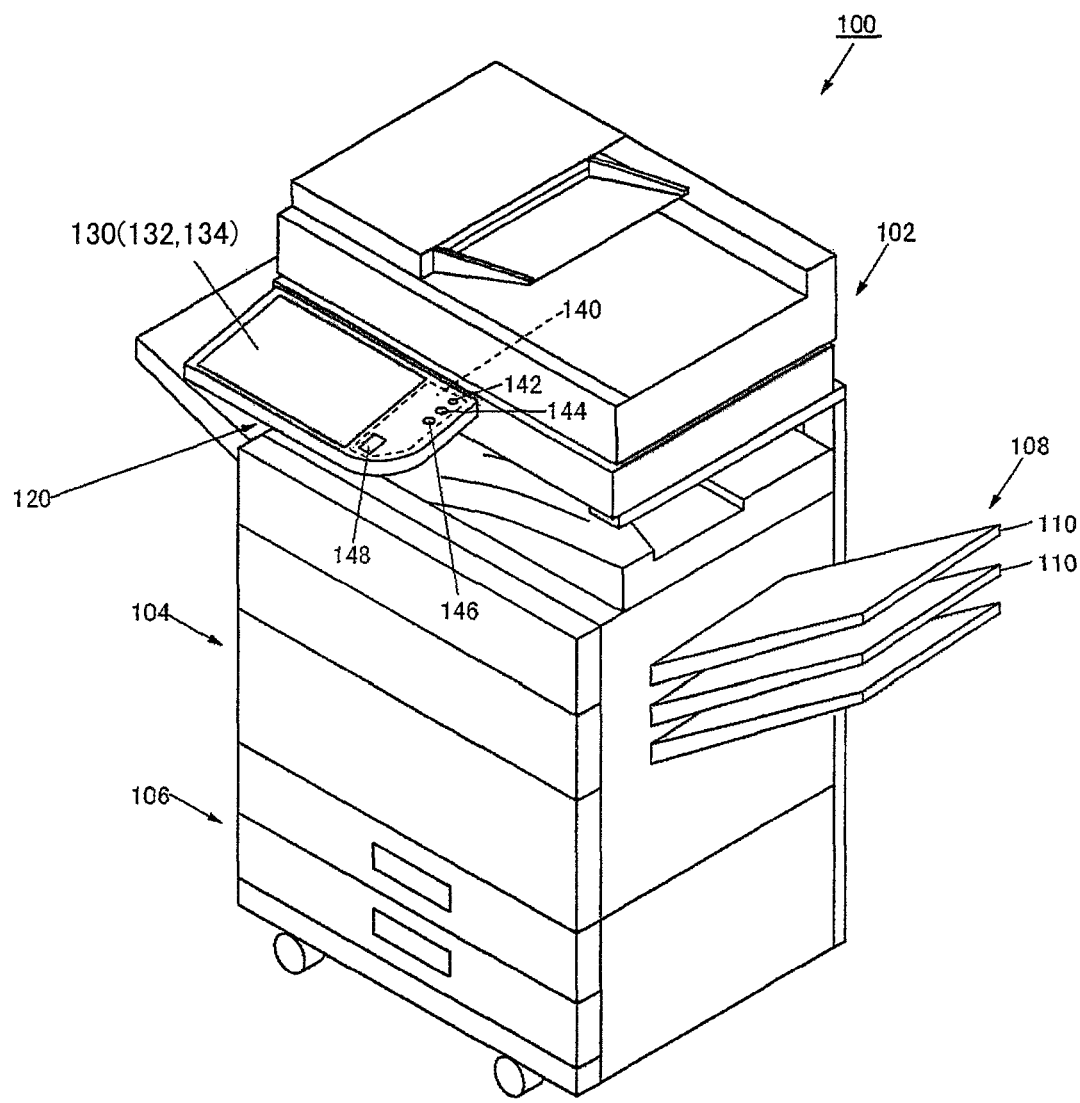
FIG. 1 is an illustrative view showing an overall configuration of an image forming apparatus according to the embodiment of the present invention.
Figure 2:
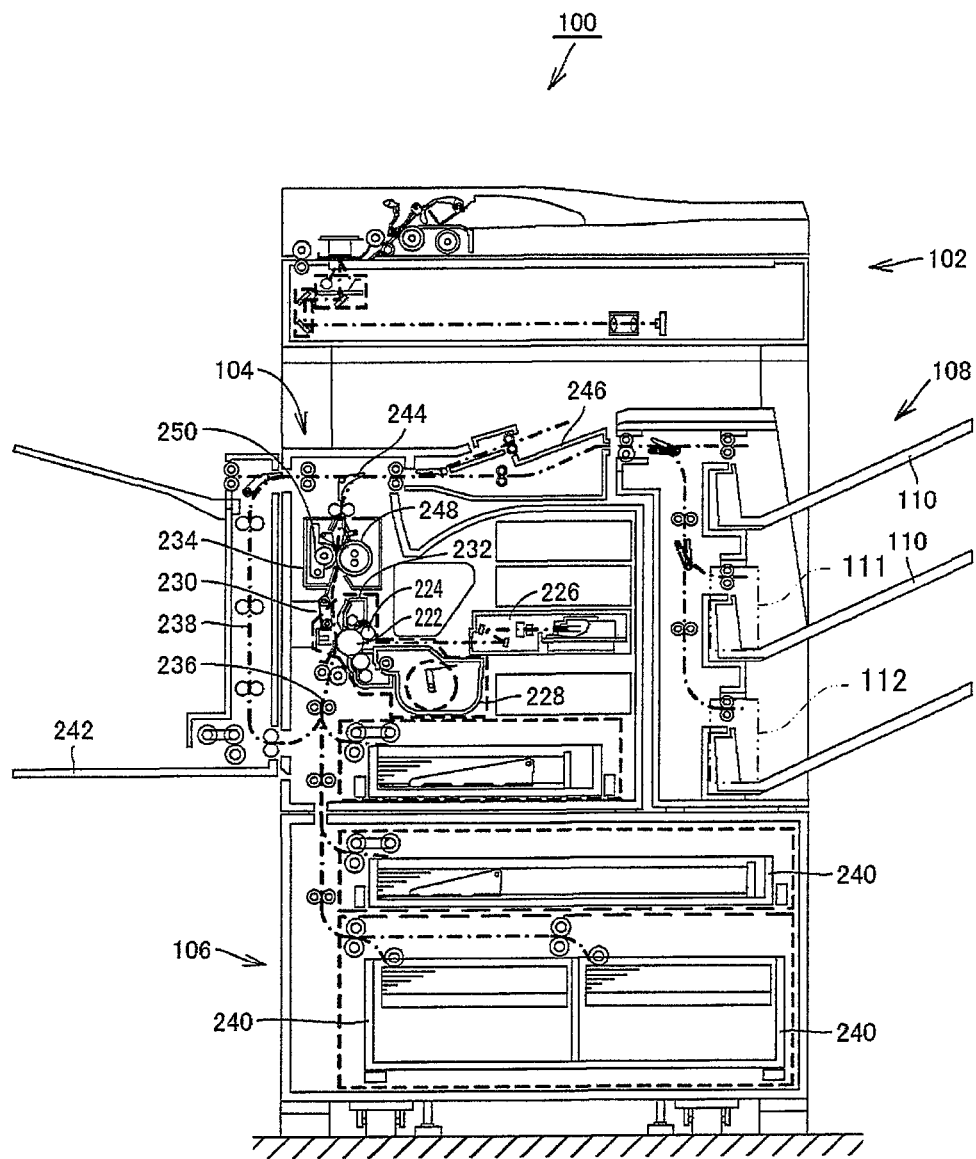
FIG. 2 is an illustrative view schematically showing the internal mechanisms of the image forming apparatus.
Figure 3:
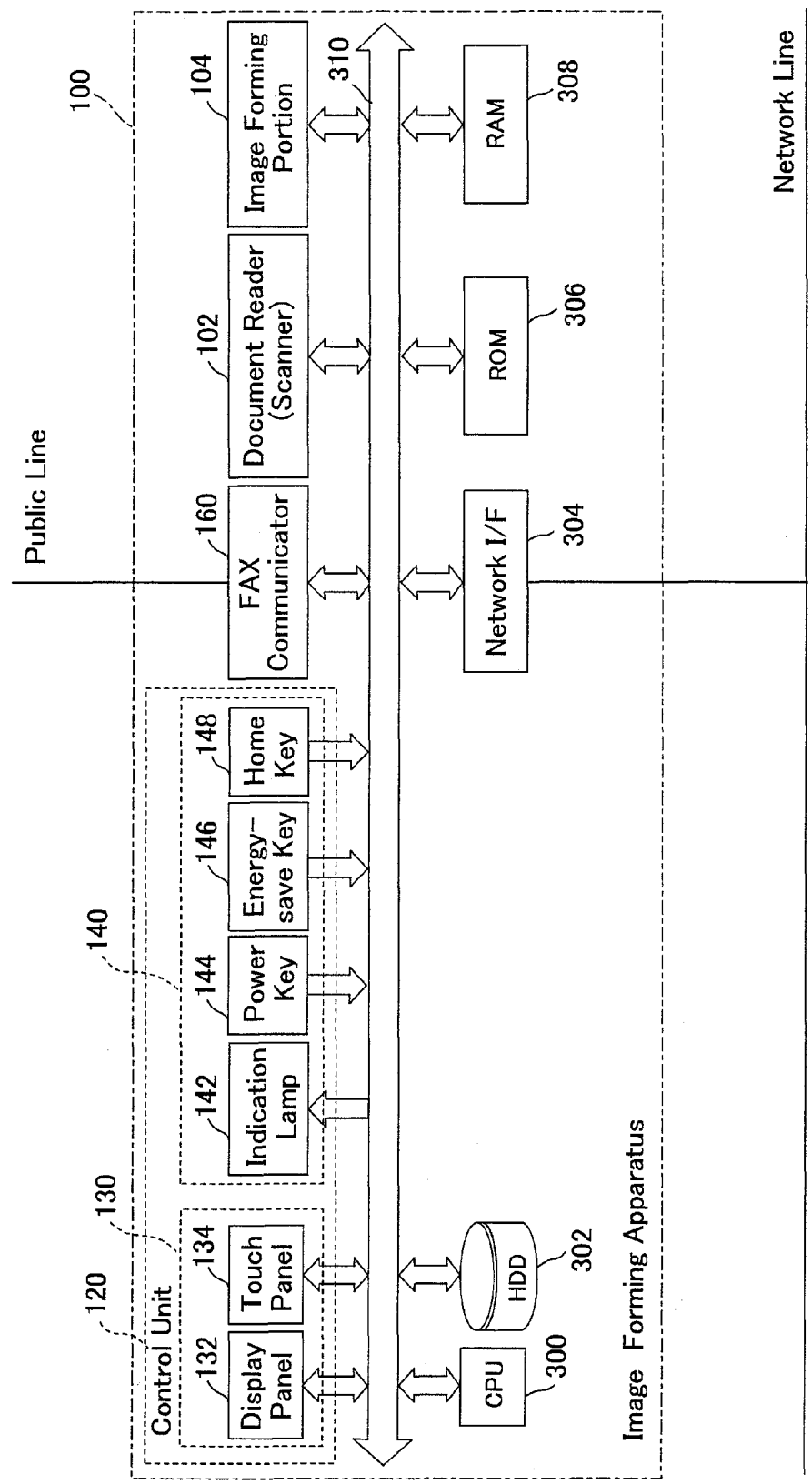
FIG. 3 is a functional block diagram showing a hardware configuration of the image forming apparatus.
Figure 4:
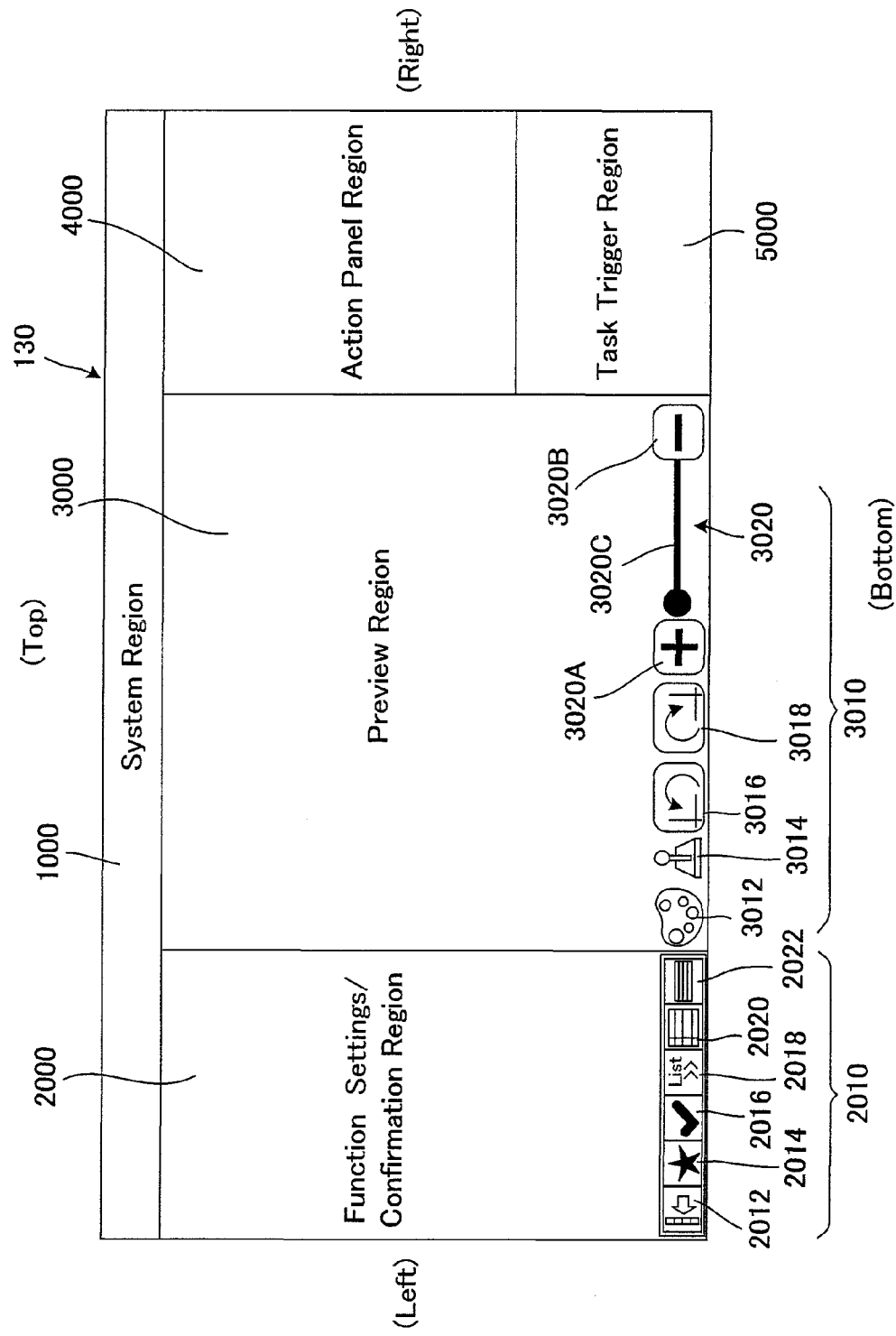
FIG. 4 is an illustrative view showing display regions on a touch panel display of the image forming apparatus.
Figure 5:
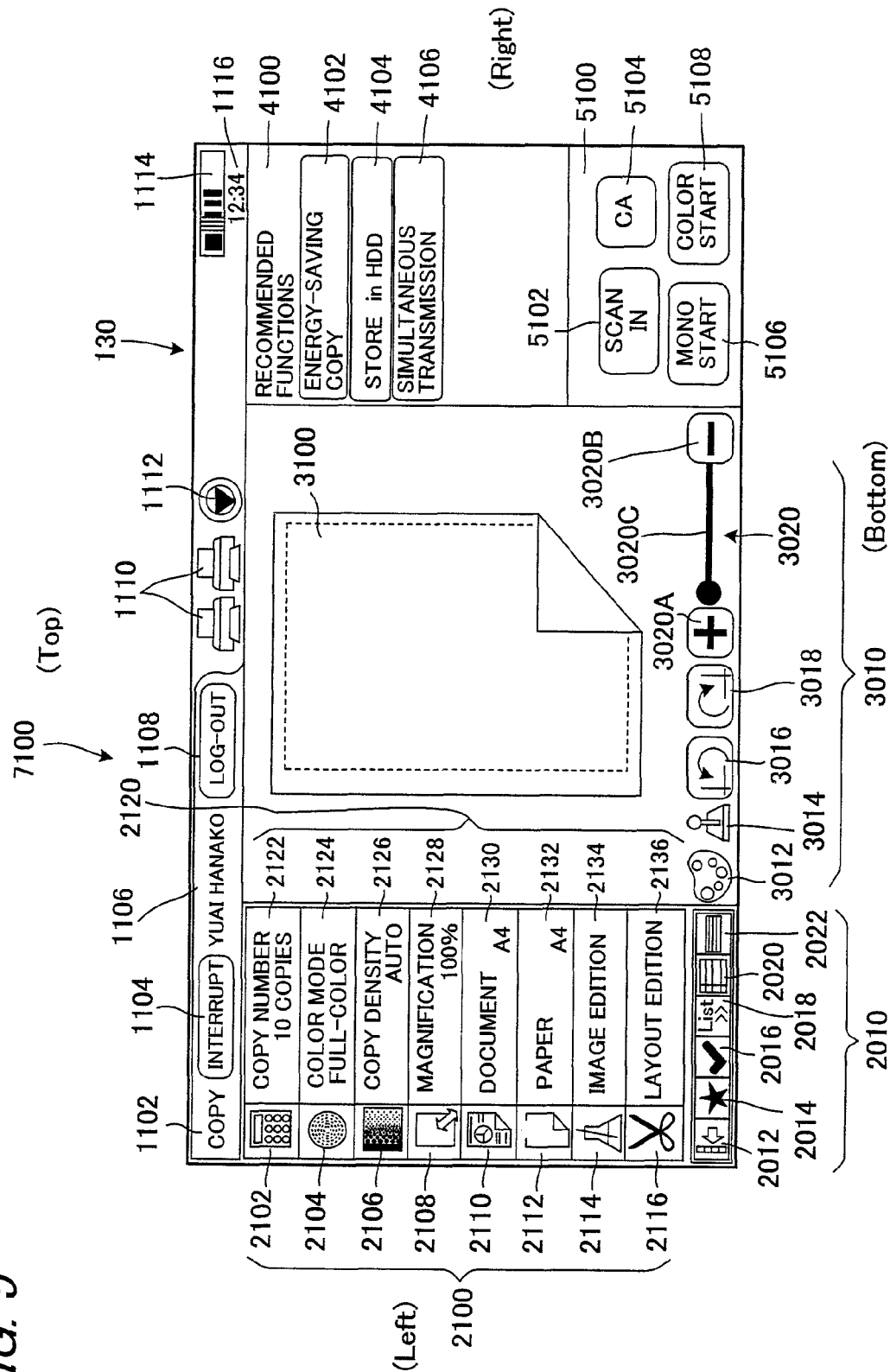
FIG. 5 is an illustrative view showing a screen example displayed on the touch panel display.

FIG. 1 is an illustrative view of one example mode of carrying out the present invention, showing an overall configuration of an image forming apparatus according to the embodiment of the present invention. FIG. 2 is an illustrative view schematically showing the internal mechanisms of the image forming apparatus. FIG. 3 is a functional block diagram showing a hardware configuration of the image forming apparatus. FIG. 4 is an illustrative view showing preview display region on a touch panel display of the image forming apparatus. FIG. 5 is an illustrative view showing a screen example displayed on the touch panel display.

An image forming apparatus 100 according to the embodiment of the present invention includes, as shown in FIG. 1, includes: a document reader (input unit) 102 having a function of receiving additional input of image data; an image forming portion (output unit) 104 for forming an image on a recording medium based on the image data input through document reader 102; and a control unit (image display control device) 120 including a display panel (display portion) 132 for displaying preview images in a preview representation, based on image data and having a function of displaying display images on display panel 132 based on the image data input from document reader 102 and a function of setting up the image output conditions of images output on the recording medium from image forming portion 104.

Control unit 120 functioning as a display control means is configured so as to set up image output conditions of images to be output, on display panel 132.

The multiple document images displayed on display panel 132 may include preview display images of document images captured by the document reader etc., of image forming apparatus 100 and preview images of finished images to be formed on recording paper by the image forming portion.

Image forming apparatus 100 of the present embodiment is a kind of an image processing apparatus. The image display control device according to the present invention is also applicable to image processing apparatus and electronic appliances other than the image forming apparatus of this kind.

Further, image forming apparatus 100 includes a plurality of operational modes, and is equipped with a display device for displaying information for each operational mode. The display device is preferably constructed so as to be able to display information the user wants in a user friendly manner even if the user does not remember the screen configuration when the operational mode is changed over.

Here, image forming apparatus 100 includes a touch panel display (control screen) that can be controlled by both gesture control and touch control other than gesture control, but the image forming apparatus may use a touch panel display that can be controlled by touch control only. Alternatively, the image forming apparatus may include a display panel that cannot be touch-controlled but can display only, with keys for control.

Here, gesture control means controls that are related to various kinds of movements of fingers in combination with GUI (Graphic User Interface), such as responses in accordance with the distance moved and speed of the fingers, double-tapping, the moving fingers trace and the like that are given with meanings.

This image forming apparatus 100 forms images on recording paper based on electrophotography.

Image forming apparatus 100 includes, as its operation modes, copy mode, facsimile mode (FAX mode), document filing mode (a mode in which scanned images are stored in a storage inside the image forming apparatus) and mail mode (a mode in which scanned images are transmitted in the form of an attachment file to an e-mail). This image forming apparatus 100 may further have a network printer mode.

The image forming apparatus 100 changes the display content on the screen every time the operation mode is switched. Further, the printing mechanism is not limited to electrophotography.

To begin with, image forming apparatus 100 will be described.

Image forming apparatus 100 according to the present embodiment includes document reader 102, image forming portion 104, a paper feed portion 106, a paper output processor 108 and a control unit 120, as shown in FIG. 1.

Control unit 120 is formed of a touch panel display 130 and a display control portion 140. Touch panel display 130 is comprised of a display panel 132 of a liquid crystal panel or the like and a touch panel (touch control detecting means) 134 that is laid over display panel 132 to detect the positions the user presses with fingers. Display control portion 140 includes an indication lamp 142, a power key 144, an energy-save key 146 and a home key 148 that resets the display content of touch panel display 130 to the home screen for operational mode selection.

In this way, image forming apparatus 100 has touch panel display 130 as a main control device and also has a display control portion 140 that includes the hardware keys and indication lamps. The keys (power key 144, energy-save key 146 and home key 148) on display control portion 140 are given as hardware buttons, in contrast to software buttons formed by touch panel display 130.

Note that image forming apparatus 100 should not be limited to that including display control portion 140 of this kind, but may be provided with touch panel display 130 only. That is, it will work as long as the initial screen of the selected operational mode can be actuated when the user selects an operational mode on the home screen displayed on touch panel display 130. Next, the operational modes of this image forming apparatus 100 will be described.

(Copy Mode)

The operation of the copy mode of image forming apparatus 100 will be described.

In this copy mode, image reader (which will be referred to hereinbelow as "scanner") 102 and image forming portion 104 operate mainly.

A document placed on a document placement table is read as image data by scanner 102 and the read image data is input to a CPU 300 of a microcomputer etc. shown in FIG. 3, where the image data undergoes various kinds of image processing, and the processed image data is output to image forming portion 104.

As shown in FIG. 2, image forming portion 104 is a mechanism that prints images of documents given as image data onto recording mediums (recording paper in most cases), including a photoreceptor drum 222, a charging device 224, a laser scan unit (which will be referred to hereinbelow as "LSU") 226, a developing device 228, a transfer device 230, a cleaning unit 232, a fixing unit 234, an unillustrated charge eraser and other devices.

Also, image forming portion 104 is provided with a main feed path 236 and a reverse feed path 238. The recording paper fed from paper feed portion 106 is conveyed along main feed path 236. Paper feed portion 106 draws recording paper, one sheet at a time, from a stack of recording paper, held in a paper feed cassette 240 or set on a manual feed tray 242 and delivers the recoding paper to main feed path 236 of image forming portion 104.

In the course of the recording paper being conveyed along main feed path 236 of image forming portion 104, the recording paper passes through and between photoreceptor drum 222 and transfer device 230 and then passes through fixing device 234 to perform printing for the recording paper.

While photoreceptor drum 222 rotates in one direction, its surface is cleaned by cleaning device 232 and the charge erasing device, then uniformly electrified by charging device 224.

LSU 226 modulates the laser beam based on the image data to be printed and repeatedly scans the laser beam over the photoreceptor drum 222 surface in the main scan direction, to form an electrostatic latent image on the photoreceptor drum 222 surface.

Developing unit 228 supplies toner to the photoreceptor drum 222 surface and develops the electrostatic latent image to form a toner image on the photoreceptor drum 222 surface.

Transfer device 230 transfers the toner image on the photoreceptor drum 222 surface to the recording paper which passes through the nip between the transfer device 230 and photoreceptor drum 222.

Fixing device 234 includes a heat roller 248 for heating recording paper and a pressing roller 250 for pressing recording paper. The recording paper is heated by heat roller 248 and pressed by pressing roller 250 so that the toner image transferred to the recording paper is fixed to the recording paper. A heater in the heat roller is heated by the power supplied to this fixing unit 234 so as to control and keep heat roller 248 at a temperature suitable for fixing. When the apparatus enters the energy saving mode, for instance the power supplied to this heater is stopped or cut down.

Arranged at the junction between main feed path 236 and reverse feed path 238 is a branch claw 244. When printing is performed on one side of recording paper only, branch claw 244 is positioned so as to lead the recording paper from fixing device 234 toward a paper output tray 246 or paper output processor 108.

When printing is performed on both sides of recording paper, branch claw 244 is rotated in the predetermined direction so that the recording paper is once conveyed toward the paper output tray 246 side. Then, the paper is switched back and conveyed toward reverse feed path 238. The recording paper then passes through reverse feed path 238 and is inverted upside down and fed to main feed path 236 again. The recording paper is once again printed on its rear side in the course of main feed path 236 and lead to paper output tray 246 or paper output processor 108.

The recording paper thus printed is lead to paper output paper output tray 246 or each of paper output trays 110 of paper output processor 108.

In paper output processor 108, a plurality of recording sheets are sorted and discharged to individual paper output trays 110, and/or each set of recording sheets is punched or stapled. For example, when multiple copies of printed documents are prepared, the printed recording sheets are sorted and discharged to paper output trays 110 so that one copy of the printed documents is allotted to individual paper output tray 110, and the printed documents on each paper output tray 110 are punched by a punching unit 111 or stapled by a stapling unit 112 to prepare individual printed material.

(Facsimile Mode)

Next, the operation in facsimile mode will be described.

In this facsimile mode, the transmitting operation is mainly effected by document reader (scanner) 102 and a FAX communicator 160, as shown in FIG. 3. The receiving operation is mainly effected by FAX communicator 160 and image forming portion 104.

(Transmitting Operation)

The transmitting operation is performed by the steps of: selecting the facsimile mode, reading image data from a document placed on the document placement table by means of document reader 102, supplying the read image data to CPU 300 made up of a microcomputer etc. shown in FIG. 3 where the image data is subjected to various kinds of image processes, and outputting the thus obtained image data to the FAX communicator (FAX communicator 160 in FIG. 3).

As shown in FIG. 3, FAX communicator 160 of the transmission side image forming apparatus 100 connects the selected transmitter side line to the designated destination, converts the image data into communication data conforming to the facsimile communication standard and transmits the communication data to the receiver side facsimile machine (e.g., image forming apparatus 100 having a facsimile function).

(Communication Operation)

When connection of the line is established, FAX communicator 160 of image forming apparatus 100 on the receiver side detects a communication request signal from FAX communicator 160 of image forming apparatus 100 on the transmitter side and sends a response signal. Then, for example, FAX communicators 160 on both the transmitter and receiver sides exchange facsimile performance information of their own with each other and determine the communication rate and coding and code correction scheme of the image data within the available maximum capacity to set up a modem communication scheme. The data is transmitted using an image signal format conforming to this communication scheme, from FAX communicator 160 of image forming apparatus 100 on the transmitter side to FAX communicator 160 of image forming apparatus 100 on the receiver side. When data transmission is ended, the line is cut off.

(Receiving Operation)

The FAX communicator 160 of image forming apparatus 100 on the receiver side converts the received data into image data and sends the data to image forming portion 104. Here, the received data may be converted into image data by image forming portion 104. Image forming portion 104 prints images of documents represented by the image data converted from the received data, onto recording paper, in the same manner as the above-described operation in copy mode.

Next, the control block configuration of image forming apparatus 100 will be described with reference to the drawings.

As shown in FIG. 3, image forming apparatus 100 includes: control unit 120 that allows the user to set copy mode and facsimile mode; a ROM 306 for storing programs etc.; a hard disk 302 serving as a non-volatile storage area that can hold programs, data and the like even if the power is cut off; and a RAM (Random Access Memory) 308 that offers a storing area when a program is executed.

Image forming apparatus 100 further includes: a bus 310 connected to image reader 102, image forming portion 104, FAX communicator 160, control unit 120, ROM 306, hard disk 302 and RAM 308; and CPU 300 that is connected to bus 310 to realize general functions as an image forming apparatus.

Hard disk 302 records (stores) files of image data of documents scanned by the image forming apparatus 100 therein. Hard disk 302 also stores initial screen data for each operational mode. The files and data stored in hard disk 302 can also be recorded in ROM 306.

Stored in ROM 306 are programs, data and the like necessary for controlling the operation of image forming apparatus 100. As the data stored in ROM 306 with the programs, the initial screen data for each operational mode may be stored. CPU 300 controls image forming apparatus 100 in accordance with the programs and data stored in ROM 306 and performs control associated with each function of image forming apparatus 100.

As shown in FIG. 3, a public line for exchange of image data is connected to FAX communicator 160 of this image forming apparatus 100 while a network line is connected to a network interface 304. This network line may be connected to a computers etc. that use this image forming portion 100 as a network printer or may be connected via the internet to a computer etc. that is identified by a designated URL (Uniform Resource Locator). When connected to the Internet in this way, the image forming apparatus 100 can obtain the necessary information via the Internet.

RAM 308 offers a function as a working memory for temporarily recording the result of the operation and processing by CPU 300 and a function as a frame memory for recording image data.

Control of image reader 102, image forming portion 104, touch panel display 130 and display control portion 140 forming control unit 120, ROM 306, hard disk 302 and RAM 308 is performed by CPU 300 executing predetermined programs. Here, control unit 120 communicates with CPU 300 by way of an input/output interface.

Control unit 120 is given as a board-like panel that is tilted so as to allow the user ease of view. Control unit 120 includes touch panel display 130 in the left area and display control portion 140 (including indication lamp 142 and hardware buttons, namely, power key 144, energy-save key 146 and home key 148) in the right area on the top thereof. Touch panel display 130 and display control portion 140 are integrally provided in control unit 120.

As described above, this touch panel display 130 is formed of display panel 132 and touch panel 134 that is laid over display panel 132.

In touch panel display 130, the home screen for selection of the operational mode in this image forming apparatus 100, the current status of this image forming apparatus 100, the status of destination selection, job processing status and the like are displayed on display panel 132. Displayed in the preview display region of display panel 132 are selection buttons as software keys. When the displayed area of a selection button is pushed by a finger, touch panel 134 detects the pushed position. Then, the position on which touch panel 134 is pressed is compared with the positions of selection buttons so as to perform selection of an operational mode of image forming apparatus 100, functional setting, operational instructions, and the like. In addition to this touch control (command input control based on the position of the user's pressing), this image forming apparatus 100 also supports the above-mentioned gesture control (command input control based on the trace of user's control motion).

Further, indication lamp 142 of display control portion 140 is made up of a LED (Light Emitting Diode) for instance and is controlled by CPU 300 so as to turn on/off (/flash on and off). When the user presses down power key 144 that is provided separately in addition to the main power switch, this image forming apparatus 100 comes out of standby mode (in which, for example, only fax reception is permitted with the main power turned on) to active mode so that the whole operational modes of this image forming apparatus 100 can be used. Indication lamp 142 comes on in link with this status. Further, when a predetermined period has elapsed without receiving any user input, or when the user presses energy-save key 146, this image forming apparatus 100 comes out of active mode into energy save mode so that only part of the operational modes of image forming apparatus 100 are operational. Indication lamp 142 flashes on and off in link with this status. Further, when the user presses energy-save key 146 in this energy save mode, the image forming apparatus 100 comes out of energy save mode into active mode. Home key 148 is a hardware key for returning the display of touch panel display 130 into the initial condition (home screen). It is noted that the operations when power key 144, energy-save key 146 and home key 148 are pressed should not be limited to these.

The hardware keys on display control portion 140 (power key 144, energy-save key 146 and home key 148) may be embedded with a key lamp controlled by CPU 300 so as to turn on/off (/flash). For example, this key lamp may be a round type key ring-like lighting or center lighting. This key lamp turns on at the timing that the hardware key is permitted to use as a control device (at the timing that operation is performed when the hardware key is used).

Image forming apparatus 100 has the aforementioned two operational modes (copy mode and facsimile mode). Software buttons for function settings in each operational mode are displayed on touch panel display 130, and also the preview as the on-screen form of forming images, keys for destination setting and the like are displayed as necessary.

When the operational mode is different from that which the user wants, touch panel display 130 displays another screen. Even in such a case, in order for the user to easily find the information the user requests, touch panel display 130 is divided into multiple regions (which also are given in a size variable manner) so as to display necessary information in each region.

In particular, in this image forming apparatus 100, when one operational mode is selected on the home screen of touch panel display 130 provided as the main display control device, the initial screen of the operational mode is displayed.

In this initial screen, (1) the basic layout is formed of five areas, namely "system region", "function selecting region", "preview region", "action panel region" and "task trigger region", which are appropriately arranged, so that the user is able to easily perform input of settings from top left to bottom right (in the same manner as the user moves their gaze and fingers in the conventional machine which is not provided with a large scale touch panel display 130). Further, (2) the concept of the displays of the five regions is consistent in all operational modes, so that the user is able to operate without confusion when another operational mode is used.

The following description will be given on the configuration of the basic layout.

The basic layout in touch panel display 130 will be described with reference to the drawings.

As shown in FIG. 4, the basic layout of touch panel display 130 is designed in the laterally long touch panel display 130 such that a system region 1000 is arranged at the topmost part, a preview region (preview display region) 3000 in the center of the screen, a function settings/confirmation region 2000 on the left side of preview region 3000, an action panel region (information display region) 4000 on the upper right part of preview region 3000, and a task trigger region (control key displayed region) 5000 on the lower right of preview region 3000. Here, the laterally long touch panel display 130 is formed of, for example, 1024 pixels wide×600 pixels high. Further, function settings/confirmation region 2000 will be written hereinbelow as function selecting region 2000.

It is noted that the number of regions in touch panel display 130 should not be limited to five. Also, the horizontal arrangement should not be limited so that the horizontal arrangement may be reversed right side left, for example, depending on the user's dominant hand. Further, the position of system region 1000 may be disposed at the lowermost part. Alternatively, the system region 1000 may be undisplayed depending on the status or settings.

System region 1000 displays the current status of this image forming apparatus 100, e.g., the title of the operational mode in control and the status and conditions of image forming apparatus 100. For example, displayed in system region 1000 are the name of operational mode, the cut-in key, the log-in user name, the job status in progress, the usage status of built-in memory, time and the like.

In function selecting region 2000, settings in each function, display switching, function selecting menu (icons, buttons, etc.) operated by user to confirm settings are variably displayed in a selected display style, i.e., in icon mode, regular mode or express mode. In icon mode, only icons for function setting are displayed in function selecting region 2000 so as to maximize the size of preview region 3000. In express mode, the display of function selecting region 2000 is enlarged so as to allow the user to set the function all at once though the size of preview region 3000 is minimized. In regular mode, preview region 3000 is sized between that in the icon mode and that in the express mode while in function selecting region 2000 the text of function titles are displayed together with functional setting icons.

These modes, i.e., icon mode, regular mode and express mode are switched from one to another based on user control. That is, the size of preview region 3000 is modified and displayed in accordance with user control. In this way, since icons are able to give information to the user by using limited area, it is preferable that every function is given with an icon so as to be able to enlarge the display of preview region 3000.

This function selecting region 2000 includes at its bottom a group of select buttons 2010 for switching the display style in function selecting region 2000. Arranged in the group of select buttons 2010 are an icon mode entering button 2012 for displaying function selecting region 2000 in icon mode, a favorite button 2014 for displaying the functions registered as "favorites", a check button 2016 for displaying the functions whose settings have been modified, a list button 2018 for displaying a list of all the functions that can be designated in the selected operation mode, a regular mode entering button 2020 for displaying function selecting region 2000 in regular mode, and an express mode entering button 2022 for displaying function selecting region 2000 in express mode.

Here, when there are many pieces of information to be displayed in function selecting region 2000, the information is displayed in this function selecting region 2000, in a vertically movable manner. In this case, this group of select buttons 2010 is not moved but constantly displayed in the bottom-most portion of function selecting region 2000.

Preview region 3000 displays the image of the output pages of the (finished) document. The image is displayed using dummy data or scanned data, and the displayed image in preview region 3000 is revised every time the user changes the finish. There are two modes of displaying the finish in this preview region 3000: the display of the final preview with a dummy image in virtual mode before scanning and the display of the final preview with actual images in scan-in mode after scanning. The virtual mode further has two types, before setting documents and after setting documents.

At the bottom of this preview region 3000 there is a group of preview select buttons 3010 for changing the display style in preview region 3000. The group of preview select buttons 3010 includes a rotate-left button 3016 for rotating the image left 90 degrees and a rotate-right button 3018 for rotating the image right 90 degrees and a zoom bar 3020. Other than these, for example a change color button 3012 and preview control button 3014 are arranged.

With this, when rotate-left button 3016 is touched once, the preview rotates 90 degrees left. When the button is touched twice, the preview is rotated 180 degrees left (inverted upside down). Alternatively, when the image of the finished document displayed in the preview region is gesture-controlled (by rotating the document image 180 degrees counterclockwise with the fingertip), the preview is rotated 180 degrees left or inverted upside down.

When rotate-right button 3018 is touched once, the preview rotates 90 degrees right. When the button is touched twice, the preview is rotated 180 degrees right (inverted upside down). Alternatively, when the image of the finished document displayed in the preview region is gesture-controlled (by rotating the document image 180 degrees clockwise with the fingertip), the preview is rotated 180 degrees right or inverted upside down.

When the (+) button 3020A of zoom bar 3020 is touched, or when bar 3020C is gesture-controlled (by the "drag or slide" gesture) toward the (+) button 3020A, the preview image is enlarged. Alternatively, when the image of the finished document displayed in the preview region is gesture-controlled (on the document image by the "pinch out/pinch open" gesture with fingertips), the preview image is enlarged. Here, the "drag" gesture is an action of moving the finger. The "pinch out/pinch open" is an action of spreading the two fingertips apart.

When the (−) button 3020B of zoom bar 3020 is touched, or when bar 3020C is gesture-controlled (by "drag or slide" gesture) toward the (−) button 3020B, the preview image is reduced. Alternatively, when the image of the finished document displayed in the preview region is gesture-controlled (on the document image by the "pinch in/pinch close" gesture with fingertips), the preview image is reduced. Here, the "pinch in/pinch close" is an action of bringing the two fingertips together.

When there are many pages of document images to be displayed in preview region 3000, touchable displayed page select buttons (page number input buttons, page up and down buttons, single page display button and multiple page display button, etc.) may be displayed. In this case, it is also possible to turn over or return the page of the document to be previewed by a sliding touch (flicking) of the document image. Further, when the document image to be displayed in preview region 3000 is large, scroll bars that can be touched or gesture-controlled may be displayed. The "flick" gesture is a soft sweeping action with the finger.

Action panel region 4000 displays information such as hint, advice and suggestion for operation and control. Display in this action panel region 4000 is given such that when a particular function is selected by a certain user, the functions associated with the subject function may be displayed, another function as to the subject function may be displayed in a purpose-oriented manner, or the function that was selected in the past in combination with the subject function by the same user or a user of the group to which this user belongs may be displayed as a "recommended function".

Task trigger region 5000 displays trigger items that the user operates in order to actually cause the image forming apparatus 100 to operate after all the settings in the operational mode have been completed. An example is the start button (software button) for starting the operation. Here, since information on a lack of a consumable supply is also related to the unfeasibility of the task in the operational modes needing a printing process (other than fax transmission), this should be also displayed in this "task trigger region".

In this case, it is also preferable that the start button is displayed only when the start button can be pressed down. The condition in which the start button can be pressed down, means a state where all settings have been completed and none of consumable supplies (recording paper and toner) will run short in the case of an operational mode needing a printing operation or a state where all the transmission parameters including destination have been set in the case of a fax mode (transmission) operation as the operational mode needing no printing.

The layout of these five regions is not changed even if the operational mode is switched from one to another (in the initial screen of any operational mode). Further, each region may change in size, expanding or contracting in the horizontal (longitudinal) direction of the screen of touch panel display 130 as in the case where the display of function selecting region 2000 (and preview region 3000) is switched between icon mode, regular mode and express mode.

The layout of the five regions is designed in light of the user interfaces in conventional machines, by directing attention to user's path of gaze and control. This arrangement leads the user to perform settings by moving their gaze from top left to bottom right and moving their input action (fingers of the dominant hand) from top left to bottom right.

In this arrangement, for switching the operational mode from one to another, the user presses down home key 148 (FIG. 3) and selects another operational mode on the home screen. In this way, it is possible to change operational mode by way of the home screen.

(Initial Screen Display Operation in Copy Mode)

When copy mode is selected, the initial screen for copy mode is displayed on touch panel display 130 using copy mode initial screen data loaded from hard disk 302 (FIG. 3) or the like.

In this occasion, a copy mode initial screen 7100 is displayed for example, on touch panel display 130, as shown in FIG. 5. Copy mode initial screen 7100 displays information using the five divided regions laid out as described above.

In system region 1000 (FIG. 4) of copy mode initial screen 7100, areas 1102, 1104, 1106, 1108, 1110, 1112, 1114 and 1116 are laid out as shown in FIG. 5.

Area 1102 denotes the operational mode being selected (copy mode in this case). Displayed in area 1102 is the name and/or icon of the operational mode.

It is also preferred that a pulldown menu showing operational modes is displayed so as to allow for switching of operational mode when this area 1102 is touch-controlled, tapped or double-tapped (the same in other operational modes).

Area 1104 displays sub information entailing the selected operational mode.

In area 1104 a cut-in key (software button) is displayed as sub information. When this cut-in key is touch-controlled, tapped or double-tapped, a cut-in process can be actuated in copy mode.

Area 1106 displays the log-in user name.

In area 1108 a log-out button (software button) is displayed.

Area 1110 displays the status of the job in progress.

Area 1112 displays buttons (software buttons) related to job status.

That is, area 1112 displays the status of the job in progress with an icon. This job status is touch-controlled, tapped or double-tapped, the job status information is displayed in detail. It is further preferable that a button for suspending the selected job and the like is displayed in area 1112.

Area 1114 displays the communication status and area 1116 displays the current time.

Displayed in function selecting region 2000 (FIG. 4) on copy mode initial screen 7100 are a function selecting menu 2100 that allows the user to select in copy mode and a group of select buttons 2010 described above. In the screen shown in FIG. 5, the function select menu is displayed in regular mode.

As shown in FIG. 5, the function select menu displayed in regular mode is composed of a group of icons 2100 and a group of texts 2120. As the function select menu displayed in function selecting region 2000, texts 2122, 2124, 2126, 2128, 2130, 2132, 2134 and 2136 are displayed.

Text 2122 shows an icon 2102 for setting the number of copies and its set content.

Text 2124 shows an icon 2104 for setting color mode and its set content.

Text 2126 shows an icon 2106 for setting copy density and its set content.

Text 2128 shows an icon 2108 for setting copy magnification and its set content.

Text 2130 shows an icon 2110 for setting the document type and its set content.

Text 2132 shows an icon 2112 for setting the paper type and its set content.

Text 2134 shows an icon 2114 for image edition and its set content.

Text 2136 shows an icon 2116 for layout edition and its set content.

Here, it should be noted that a greater number of items can be also displayed in the function setting menu, in a vertically scrollable manner with the position of select buttons 2010 fixed. In this case, the displayed items inclusive of hidden items above and below, can be changed from one to another by any of touch control (scroll control) and gesture control (flick control in the vertical direction).

Here, the image edition is edition for one page document, and includes, as a lower-layered menu, frame deletion, printing menu, watermark, user stamp and the like. The layout edition is edition for multiple pages of documents, and includes, as a lower-layered menu, page integration, binding margins, page change, centering and the like. Subordinates menus under these will be displayed on touch panel display 130 by touching, taping or double-tapping icons 2102 to 2116 or texts 2112 to 2136.

Arranged in preview region 3000 (FIG. 4) on copy mode initial screen 7100 are a document output (finish) image 3100 and a group of preview select buttons 3010 stated above. In this arrangement, dummy data or scanned data is used to display image 3100, and the image 3100 is changed and displayed in preview region 3000 every time the function setting menu in function selecting region 2000 is changed (the preview display is changed).

Displayed in action panel region 4000 (FIG. 4) on copy mode initial screen 7100 is information such as hint, advice and suggestion for copying operation. Here, recommended functions in the copy mode that the user selects are displayed as shown in FIG. 5. In this case, action panel region 4000 includes an area 4100 for displaying the content of displayed information and areas 4102 to 4106 that serve in themselves as software buttons and display text indicating recommended functions.

When area 4102 is touch-controlled, tapped or double-tapped, a pulldown menu of further detailed information for energy-saving in copying is displayed. In this case, for example a software button for entering the function setting screen for duplex copying is displayed with text "Duplex printing will save paper", a software button for entering the function setting screen for page integration with text "Printing multiple documents integrally will save paper", and a software button for entering the function setting screen for saddle stitch binding with text "Printing can be done so as to bind the paper as a booklet".

Displayed in task trigger region 5000 (FIG. 4) on copy mode initial screen 7100 is a group of command buttons 5100. These command buttons 5100 include a scan-in key (software button) 5102, a clear-all key (software button) 5104, a monochrome start key (software button) 5106 and a color start key (software button) 5108.

Scan-in key 5102 is a key for causing image forming apparatus 100 to scan a document to obtain image data.

Clear-all key 5104 is a key for clearing the set functions.

Monochrome start key 5106 is a key for causing image forming apparatus 100 to scan a document and perform monochrome copying.

Color start key 5108 is a key for causing image forming apparatus 100 to scan a document and perform color copying.

In this way, when the user inputs a request in copy mode initial screen 7100 displayed with information in five-divided regions, a copying process is implemented in accordance with the request.

Next, the display modes of the touch panel display in image forming apparatus 100 will be described with reference to the drawings.

Figure 6:
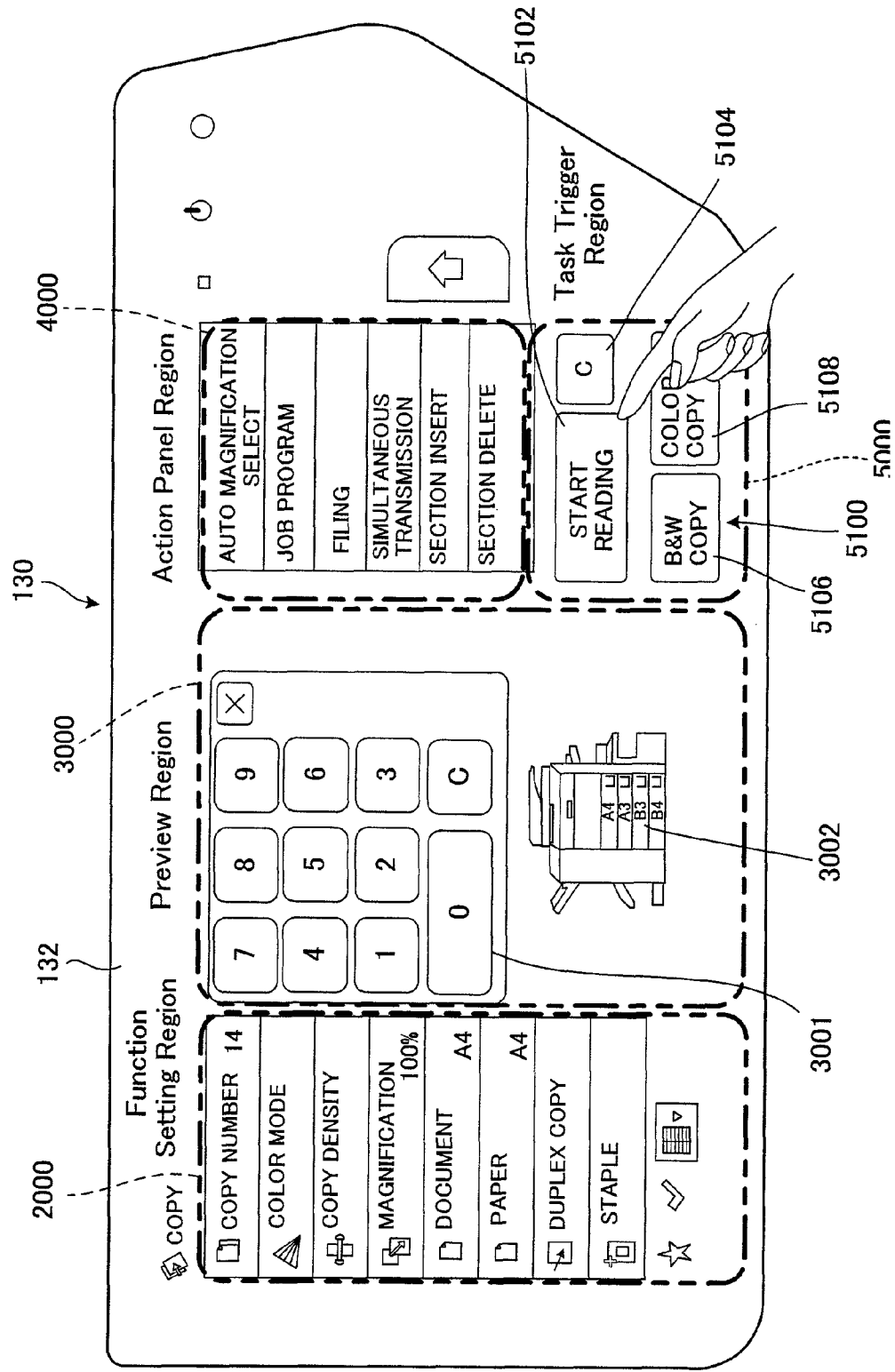
FIG. 6 is an illustrative view showing one display mode example of a display panel of the touch panel display.

FIG. 6 is an illustrative view showing one display mode example of the touch panel display in the image forming apparatus.

As shown in FIG. 6, arranged on touch panel display 130 in image forming apparatus 100 are preview region 3000 in the center of the screen and function selecting region 2000 on the left side of preview region 3000. Action panel region 4000 is laid out on the upper right of preview region 3000, and task trigger region 5000 is arranged under the action panel region 4000.

Displayed in preview region 3000 are a virtual ten-key pad 3001 and a mimic display 3002 that gives an image of the whole apparatus.

Displayed in task trigger region 5000 is a group of command buttons 5100.

In the group of command buttons 5100, scan-in key 5102, clear-all key 5104, monochrome start key 5106 and color start key 5108 are laid out.

Next, the electric configuration of control unit 120 will be described with reference to the drawings.

Figure 7:
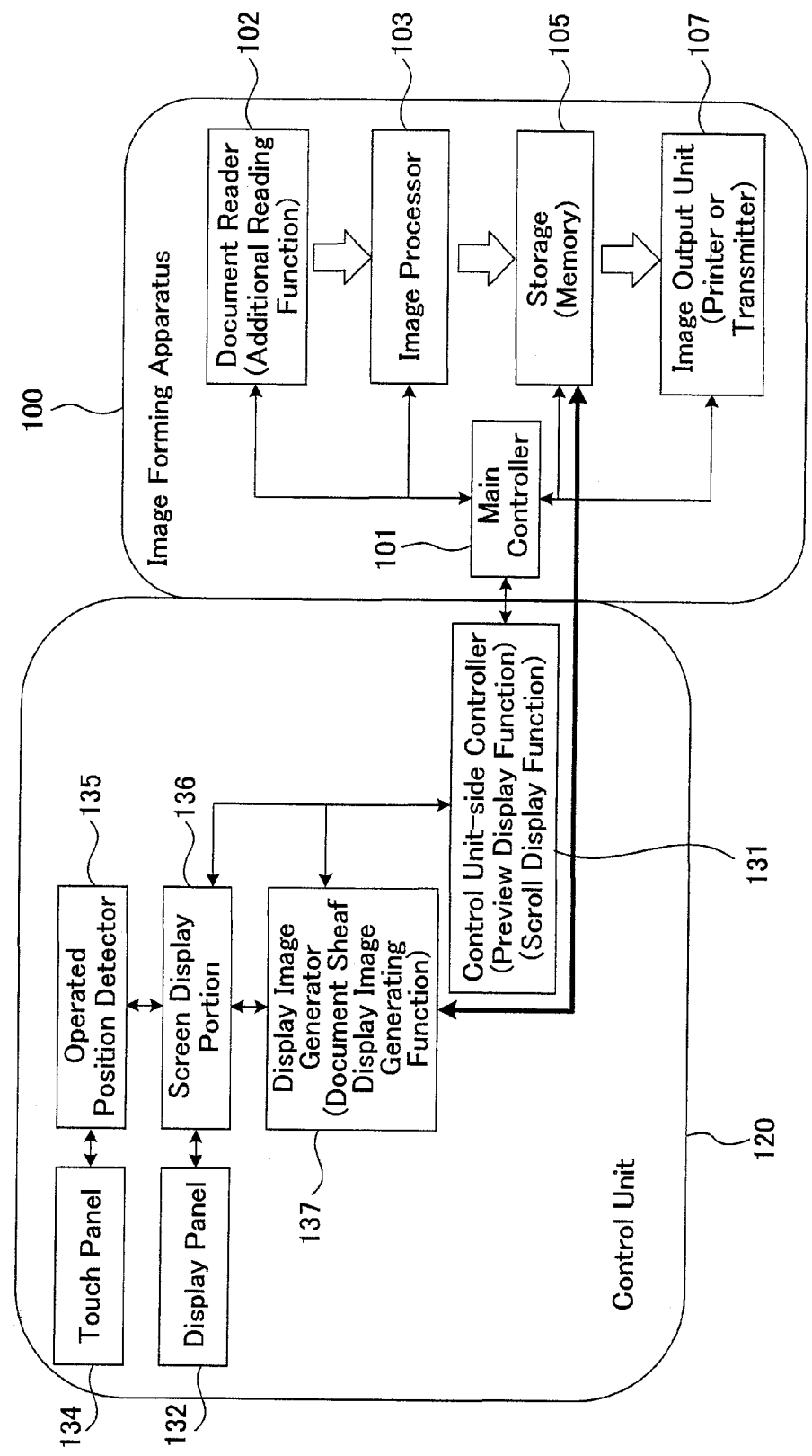
FIG. 7 is a block diagram showing an electric configuration of a control unit in the image forming apparatus.
Figure 8:
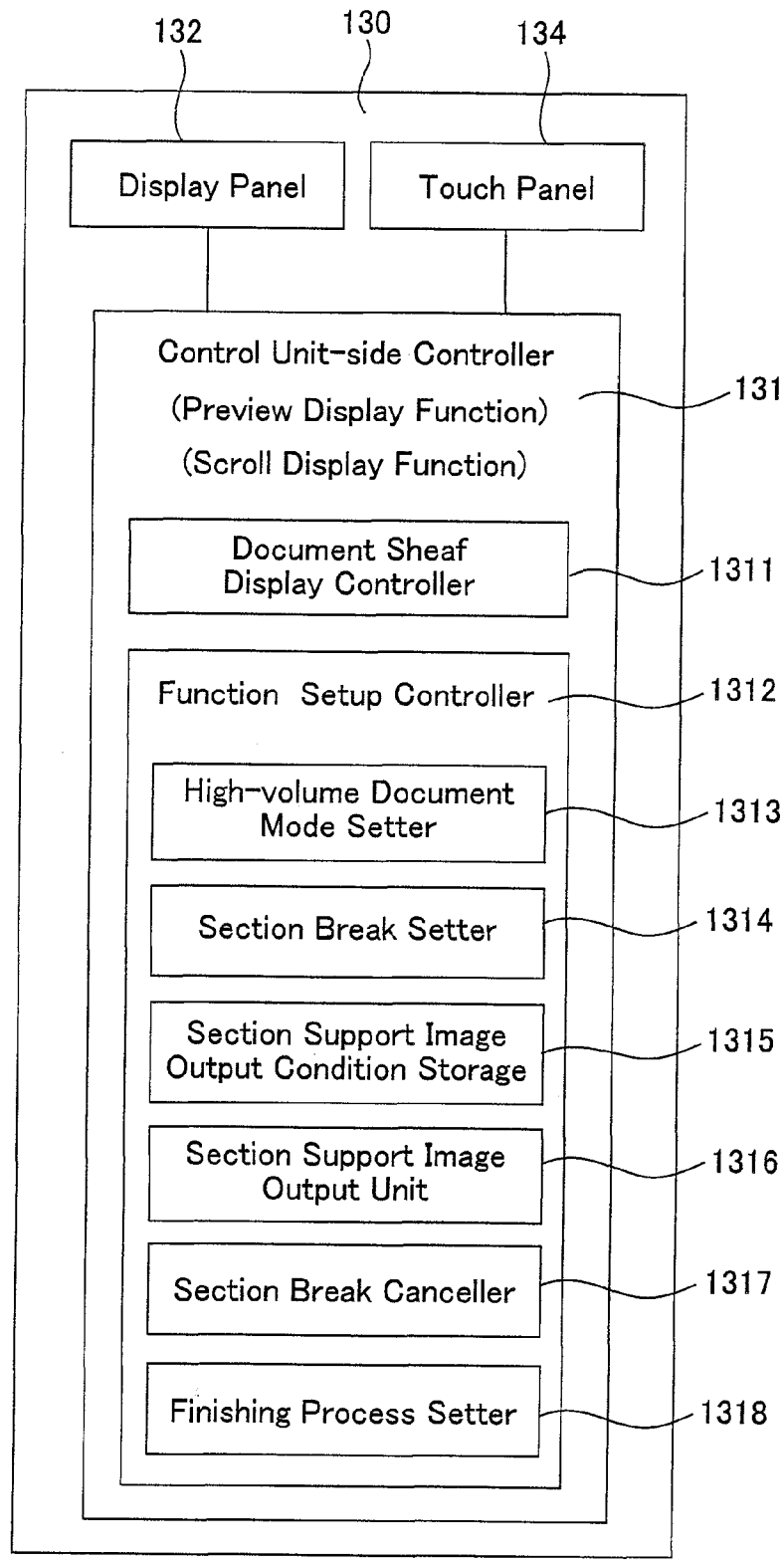
FIG. 8 is a block diagram showing a configuration of the touch panel display of the control unit.

FIG. 7 is a block diagram showing an electric configuration of a control unit in the image forming apparatus. FIG. 8 is a block diagram showing a configuration of the touch panel display of the control unit.

As shown in FIG. 7, control unit 120 of the present embodiment includes, in addition to display panel 132 and touch panel 134, an operated position detector 135, a screen display portion 136, a display image generator 137 and control unit-side controller (display controller) 131 for controlling processing and operation in control unit 120.

Image forming apparatus 100 includes document reader 102 for capturing image data, an image processor 103, a storage 105 for storing image data input through document reader 102 and an image output unit 107 such as a printer, transmitter or the like for outputting images, all being operated and controlled by a main controller 101.

Document reader 102 has an additional reading function which enables additional reading (additional input) of additional documents after completion of reading of desired documents (image data).

Operated position detector 135 detects the operated position on touch panel 134.

Screen display portion 136 displays an image formed by display image generator 137 on display panel 132.

Display image generator 137 prepares a predetermined image based on image data input to the main body of image forming apparatus 100, following instructions from control unit-side controller 131 and also has a function of forming display images of document sheaves consisting of a series of multiple documents scanned by image reader 102 (document sheaf display image generating function).

Control unit-side controller 131 is connected to main controller 101 of the main body of image forming apparatus 100 and functions as a controller in touch panel display 130.

Now, control unit-side controller 131 will be described in detail.

As shown in FIG. 8, control unit-side controller 131 has a preview display function of giving a display image based on the documents scanned by document reader 102 on touch panel display 130 in a preview representation and a scroll display function of multiple pages of display images given in a preview representation in a movable manner.

Control unit-side controller 131 further includes a document-sheaf display controller 1311 and a function setup controller 1312.

Document-sheaf display controller 1311 displays a display image of a document sheaf made up of a series of multiple documents scanned by document reader 102, and gives a display image of a document sheaf based on the documents scanned before an additional scanning of documents (which will be called hereinbelow a "previously scanned document sheaf") and a display image of a document sheaf based on the documents additionally scanned (which will be called hereinbelow as an "additional document sheaf"), in a preview representation in a distinctive manner on touch panel display 130.

Function setup controller 1312 has a function of setting up image output conditions of the images to be output from image output unit 107.

Function setup controller 1312 includes a high-volume document mode setter (additional input mode setter) 1313, a section break setter 1314, a section support image output condition storage 1315, a section support image output unit 1316, a section break canceller 1317 and a finishing process setter 1318.

High-volume document mode setter 1313 has a preview document sheaf-forming function of reading a plurality of documents multiple times to form a plurality of preview document sheaves.

Further, high-volume document mode setter 1313 has an individual setup function for setting up different image output conditions for each individual preview document sheaf among the scanned multiple preview document sheaves and an all-in setup function for setting up the same image output conditions for all the scanned multiple preview document sheaves.

Here, the high-volume document mode in the present embodiment may include a case where if, for example the volume of documents to be scanned exceeds the accommodatable number of document sheets to the ADF (automatic document feeder), the remaining documents can be added later (additionally scanned) after a suspension of scanning. That is, after setting the additional documents to the ADF, the start key ("additional scan-in key 5102" in FIGS. 12 to 14 or "scan-in key 5102" in FIGS. 15 and 16) is pressed down to restart reading. Here, it is also possible to provide a dedicated key to enter to the high-volume document mode, though in the present embodiment, "additional scan-in key 5102" in FIGS. 12 to 14 or "scan-in key 5102" in FIGS. 15 and 16) is used as the command key to enter the high-volume document mode.

Section break setter 1314 has a section break setting function of creating a section break that divides the additionally input image data from the previously input image data when image data is additionally input.

Section support image output condition storage 1315 has an image output condition storing function of storing image output conditions set for each section.

Section support image output unit 1316 has an image output executing function of outputting images based on the setup of image output conditions for each section.

Section break canceller 1317 has a section break canceling function cable of arbitrarily canceling a set section break.

The section break setting function of section break setter 1314 includes a section timing setting function of setting a section break at an arbitrary timing when image data is additional input, and a section position setting function of setting a section break at an arbitrary position in the array of image data stored in the input order.

Function setup controller 1312 includes an intra-section image output condition reconfiguring function of enabling setup change of image output conditions that have been set at an arbitrary position in the array of image data inside a section divided by the section breaks, and an intra-section reconfiguration validating function of making the setup change of image output conditions effective inside the whole section. With this arrangement, it is possible to make the settings effective inside the same section even if function setup is performed at any time.

Further, in setting up image output conditions, function setup controller 1312 enables setup of all the functions of the function setup controller 1312.

When no high-volume document mode is set up and if the image output conditions for an additionally scanned document sheaf are different from the image output conditions for the previously scanned document sheaf, function setup controller 1312 makes the image output conditions for the document sheaf to be additionally scanned, valid for all the documents including the document sheaf before additional reading.

Finishing process setter 1318 has a finishing process setting function of setting finishing processes such as stapling/punching, page allocation and the like after image output. The finishing process may be specified with the same settings for multiple sections.

Referring next to schematic diagrams, description will be made on one image output example in which the image output conditions for documents to be additionally scanned are reconfigured after setting a section break in high-volume document mode.

Figures 9A, 9B:
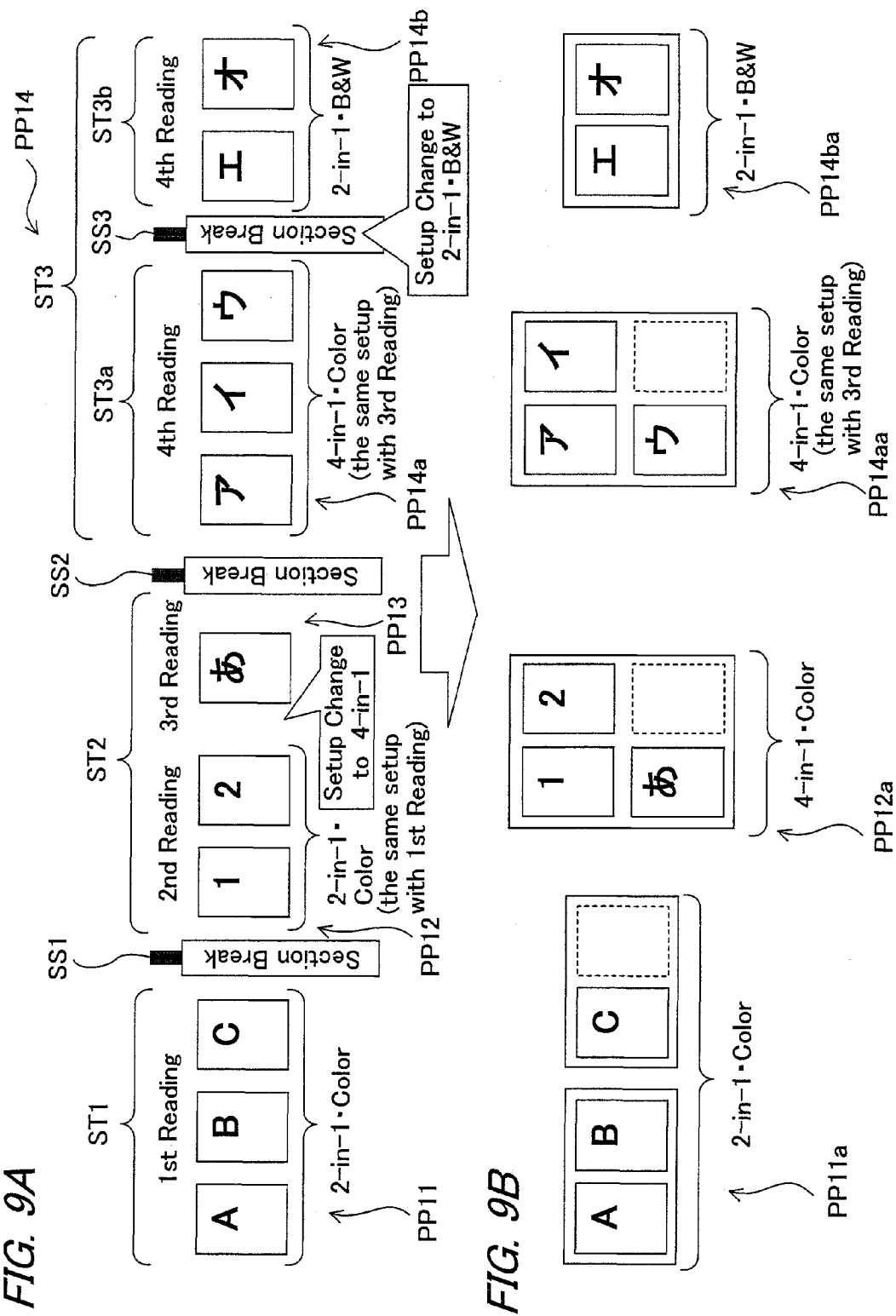
FIG. 9A is an illustrative view showing a state where the setup of image output conditions is changed for each of sections generated by setting section breaks at the times of additional reading in high-volume document mode in the image forming apparatus.
FIG. 9B is an illustrative view showing image output states corresponding to the sections generated at the times of additional reading in high-volume document mode in the image forming apparatus.

FIG. 9A is an illustrative view showing a state where the setup of image output conditions is changed for every section generated by setting a section break (at the time of additional reading) in the high-volume document mode in the image forming apparatus of the present embodiment. FIG. 9B is an illustrative view showing image output states corresponding to the sections generated (at the times of additional reading) in the high-volume document mode in the image forming apparatus.

In this example, as shown in FIG. 9A, in the high-volume document mode (additional reading), a multiple number of section breaks that divide image data are set at different positions in the array of image data made up of multiple bunches of scanned image data, and image output conditions are set up for each of the sections thus created by the section breaks.

Specifically describing, in the high-volume document mode (additional reading) of image forming apparatus 100, the image output conditions at the first image reading are set with "2 in 1 and color", and a section break SS1 is set when the first image reading has been performed, to create a first section ST1. Then, a second additional reading is subsequently performed. The image output conditions at this time are set with the same as those at the first image reading, i.e., "2 in 1 and color". Here, the image output condition "N in 1" is the setting for forming N document images on one page of recording paper. Accordingly, the "2 in 1" setting is to form two document images on one page of recording paper, whereas the "4 in 1" setting is to form four document images on one page of recording paper.

Then, when the second additional reading has been performed, a third additional reading is performed by changing the image output conditions to "4 in 1 and color". Then when the third additional reading has been performed, a section break SS2 is set to create a second section ST2.

Thereafter, a fourth additional reading is performed and image reading is ended.

The setup of image output conditions at this time is the same as that at the third additional reading, i.e., "4 in 1 and color". When the fourth additional reading has been performed, a third section ST3 that bundles up the image data at the third and fourth reading is created.

Next, when the third section ST3 is divided after its creation, a third section break SS3 is created inside the third section ST3 to divide the third section ST3 into sections ST3*a* and ST3*b*. When the third section break SS3 is set up, the image output conditions are set with "2 in 1 and black & white".

The image output of document sheaves (the array of image data), divided into multiple sections by the section breaks in the above way, each section being set with different image output conditions, is given such that the document sheaf PP11 in the first section ST1, which is the result of the first reading, is output in "2 in 1 and color" printing, the document sheaves PP12 and PP13 in the second section ST2, which are the result of the second and third reading, are output in "4 in 1 and color" printing, as shown in FIG. 9B. Here, reference numerals PP11*a* denotes the output images of document sheaves PP11 and PP12*a* denotes the output image of document sheaves PP12 and PP13.

Then, the image output of document sheaf PP14 in the third section ST3 that was scanned at the fourth reading, is given such that the section is divided by section break SS3 into sections ST3*a* and ST3*b*, and document sheaf PP14*a* in section ST3*a* is output as an output image PP14*aa* set in "4 in 1 and color" printing while document sheaf PP14*b* in section ST3*b* is output as an output image PP14*ba* set in "2 in 1 and black & white" printing.

In the above way, according to the present embodiment, since the additionally scanned array of image data is divided into sections with each corresponded to particular image data, by setting up section breaks so that each section is set with individual image output conditions, it is possible to output images for the image data belonging to the same section under the same image output conditions.

Next, description will be made on one comparative image output example when the image output conditions for the documents that are additionally read in the high-volume document mode without setting any section break, are reconfigured.

FIG. 10A is an illustrative view showing a state where the setup of image output conditions is changed when additional reading is performed in the high-volume document mode (additional reading) without setting any section break. FIG. 10B is an illustrative view showing an image output state in normal mode.

In this comparative example, in the additional reading in normal mode of image forming apparatus 100, image output conditions are reconfigured when additional reading is performed, as shown in FIG. 10A.

Specifically describing, for example, in the additional reading in normal mode of image forming apparatus 100, the image output conditions at the time of the first and second image reading are set with "2 in 1 and color". Then the image output conditions at the time of the third additional reading is changed to "4 in 1 and color", and then the fourth additional reading is performed. The image output conditions at the fourth additional reading are the same as the setup of the third image reading, or set with "4 in 1 and color".

Here, in the prior art, it is impossible to change the setup of the image output conditions for part of an additional sheaf of documents that were additionally scanned. For example, the image output conditions for part of a document sheaf PP24 that have been set with "4 in 1 and color" at the time of the fourth additional reading, cannot be changed to "2 in 1 and black & white", as shown in FIG. 10A.

Accordingly, the image output of the document sheaves (the array of image data) for which image output conditions were set at the time of additional reading, is given such that document sheaves PP21 and PP22 scanned at the first and second reading are output in "2 in 1 and color" printing, a document sheaf PP23 scanned at the third reading and a document sheaf PP24 scanned at the fourth reading after the third reading, are output in "4 in 1 and color" printing, as shown in FIG. 10B. Here, reference numerals PP21a denotes the output images of document sheaves PP21 and PP22 and PP23a denotes the output images of document sheaves PP23 and PP24.

That is, in the comparative example, it is possible to change the settings of image output conditions when additional reading of documents is performed, but complex change of settings as in the present embodiment is not permitted.

Next, some examples of additional reading of documents being implemented by document reader 102 in image forming apparatus 100 of the present embodiment will be described with reference to the drawings.

Example 1

Example 1 shows a case where document reading is performed in copy mode, and a section break is inserted at the timing of additional reading (high-volume document mode) so as to create a section for which image output conditions are reconfigured.

Figure 11:
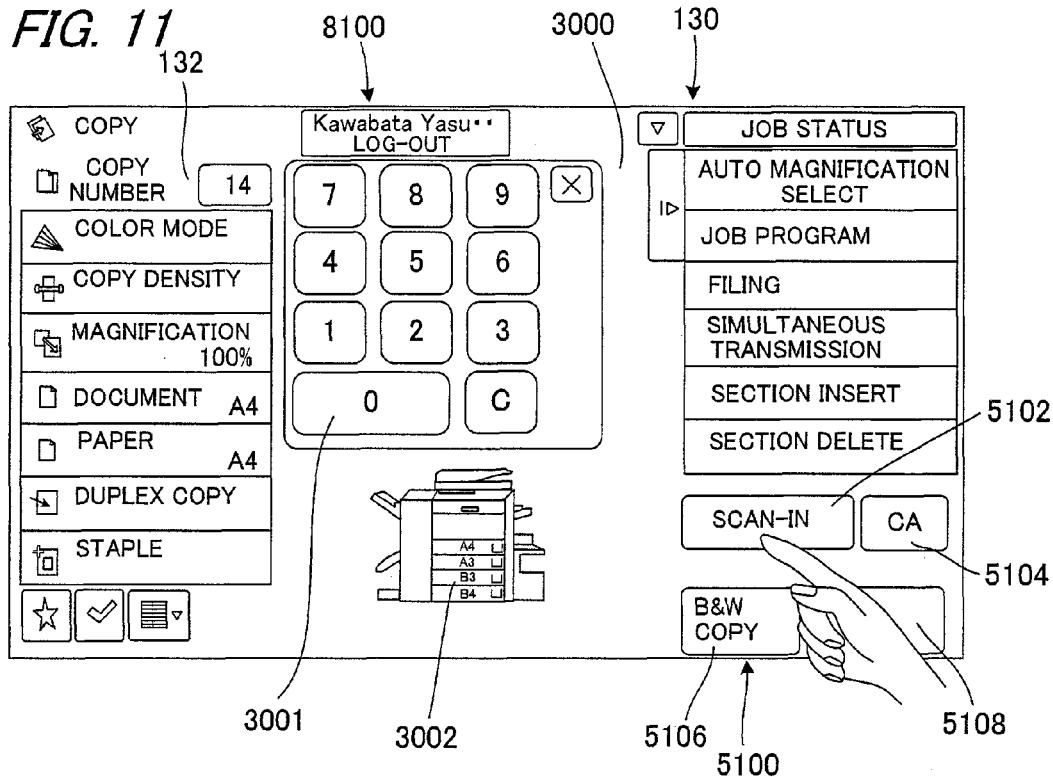
FIG. 11 is an illustrative view showing an initial screen in copy mode in an image forming apparatus of example 1.
Figure 12:
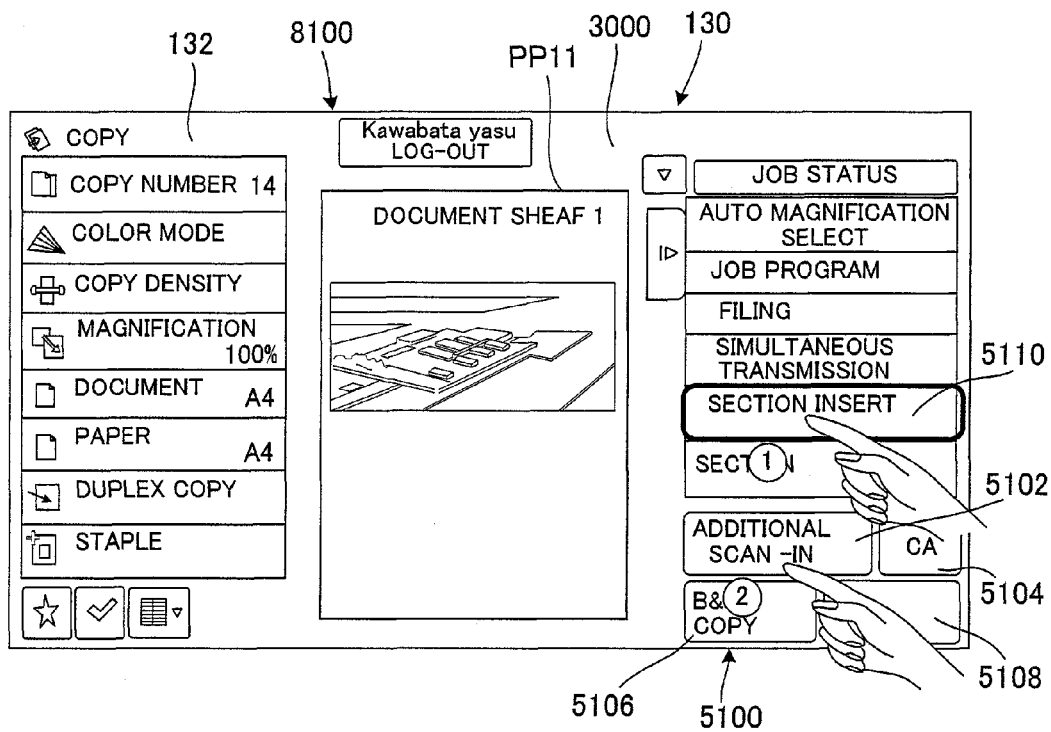
FIG. 12 is an illustrative view showing a display screen when a section break is set up to perform additional reading after document reading has been completed in the image forming apparatus.
Figure 13:
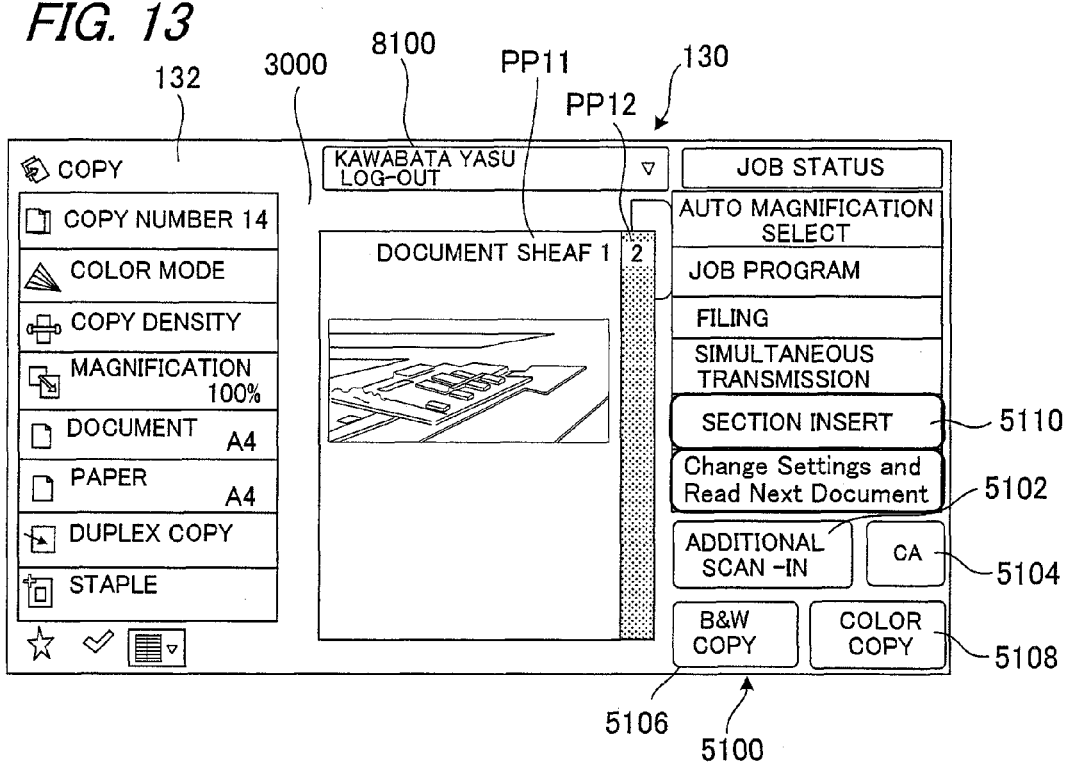
FIG. 13 is an illustrative view showing a display screen on which preview display of a plurality of document sheaves including an additional document sheaf is given when an additional reading operation has been performed after a document reading operation in the image forming apparatus.
Figure 14:
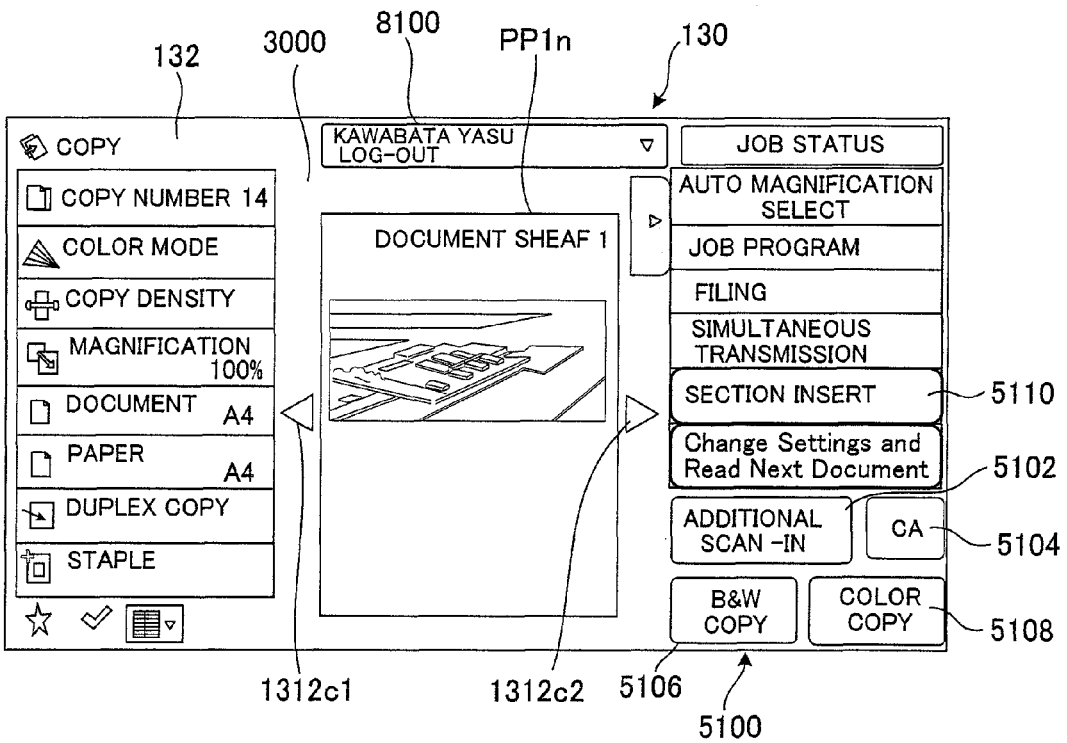
FIG. 14 is an illustrative view showing another preview display example representing scanned document sheaves.

FIG. 11 is an illustrative view showing the initial screen in copy mode in the image forming apparatus of example 1. FIG. 12 is an illustrative view showing a display screen when a section break is inserted to perform additional reading after document reading has been completed in the image forming apparatus. FIG. 13 is an illustrative view showing a display screen on which preview display of a plurality of document sheaves including an additional document sheaf is given when an additional reading operation has been performed after a document reading operation in the image forming apparatus. FIG. 14 is an illustrative view showing another preview display example representing scanned document sheaves.

When documents to be copied are read in high-volume document mode in image forming apparatus 100, the user selects the copy mode in the home screen displayed on touch panel display 130 to display a copy mode initial screen 8100, as shown in FIG. 11.

Then, the user touches scan-in key 5102 to start document reading. In this case, a plurality of documents of, for example A4 size are set in long-edge feed orientation in document reader 102 (FIG. 1).

When the documents are scanned by document reader 102, a display image of a document sheaf consisting of multiple documents is generated based on the image data of the scanned multiple documents by display image generator 137, and a first document sheaf PP11 is displayed in the center of preview region 3000, as shown in FIG. 12. At this time, the image information on the front page of the scanned documents is displayed on the first document sheaf image PP11. The display of scan-in key 5102 is changed from "SCAN-IN" to "ADDITIONAL SCAN-IN".

When a section break is set at this point and additional reading is performed, a section break key 5110 functioning as section break setter 1314 is touched to set up a section break, and then additional scan-in key 5102 is touched to start additional reading of documents.

Then, when additional reading is implemented, a second document sheaf image (additional document sheaf image) PP12 is generated by display image generator 137 as shown in FIG. 13, based on the image data of additionally scanned, multiple documents and displayed in preview region 3000. The second document sheaf image PP12 is displayed in the same size as the first document sheaf image PP11 and overlapped behind first document sheaf image PP11. The second document sheaf image PP12 is laid out with part of it exposed from behind the first document sheaf image PP11 so as to have its existence recognized.

Though in example 1, preview display is given in preview region 3000 by placing document sheaf PP11 over document sheaf PP12, another preview display example is shown in FIG. 14. In FIG. 14, page-flip buttons 1312c1 and 1312c2 may be displayed on both sides (at one of the sides when the first or last document sheaf image is displayed) of the preview of document sheaf PP1n in preview region 3000, as shown in FIG. 14.

In this arrangement, it is possible to replace the document sheaf image PP1n that is being displayed in preview representation in preview region 3000 with the last, precedent additional document sheaf image PP1n−1, by touching page-flip button 1312c1, to thereby display the document sheaf image PP1n−1. In contrast, when page-flip button 1312c2 is touched, it is possible to replace the document sheaf image PP1n that is being displayed in preview representation in preview region 3000 with the next, following additional document sheaf image PP1n+1, to thereby display the document sheaf image PP1n+1.

In this way, it is possible to easily display the sheaves of documents that have been additionally scanned one to the next, by touching page-flip buttons 1312c1 or 1312c2.

Figure 15:
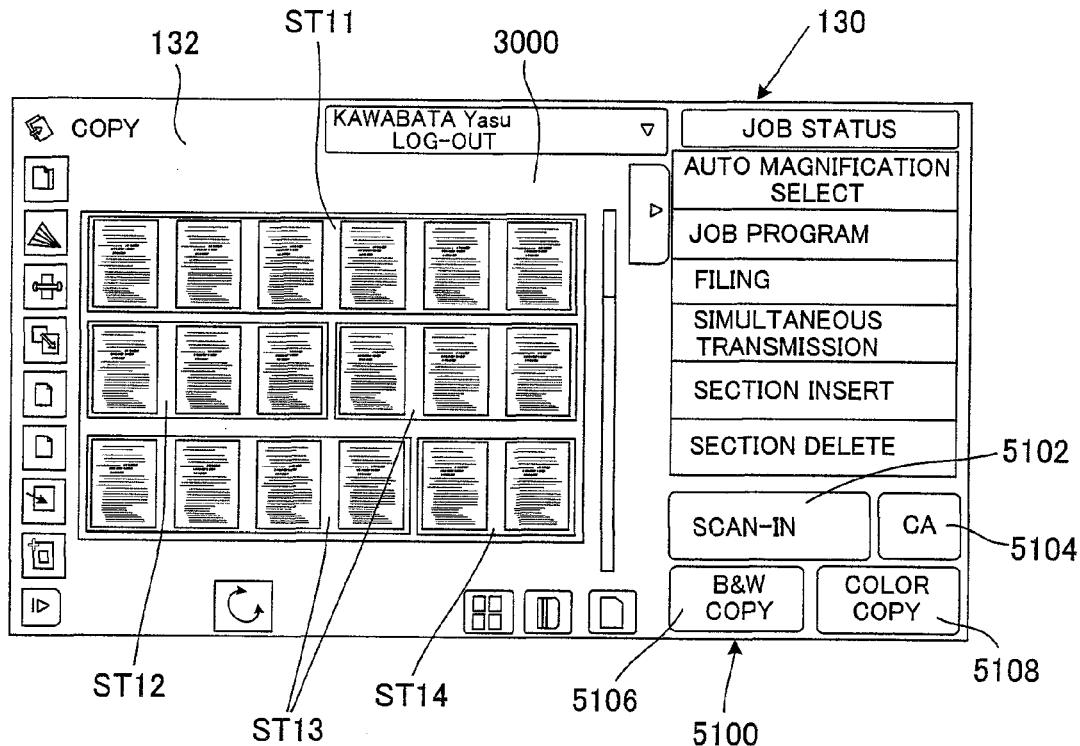
FIG. 15 is an illustrative view showing another preview display example.

Further, as another preview display example, it is possible to present a predetermined number of document images scanned in high-volume document mode, in preview representation, as shown in FIG. 15. In this case, setting section breaks makes it possible to present display images enclosed by each of sections ST11, ST12, ST13, ST14 . . . with an associated frame. It is also possible to display the background of each section with a different color from that of other sections.

Figure 16:
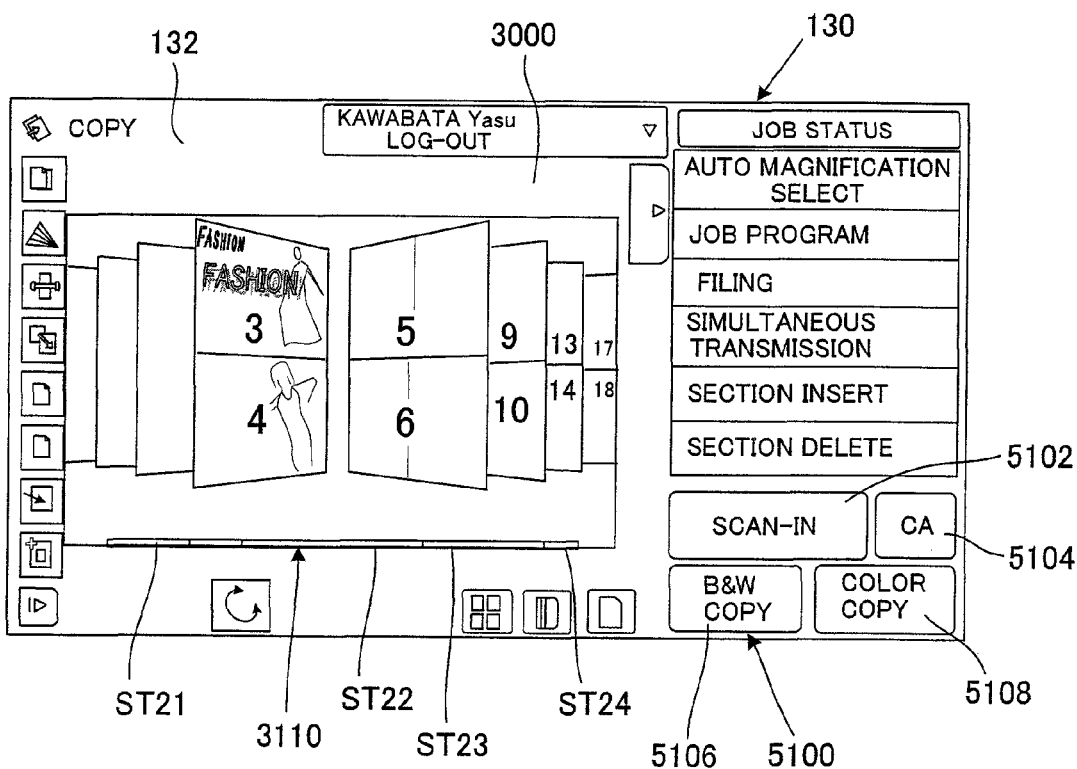
FIG. 16 is an illustrative view showing still another preview display example.

Alternatively, as shown in FIG. 16, it is also possible to display multiple document images scanned in high-volume document mode, in a page-flippable 3D (three-dimensional) preview presentation. In this case, it is possible to display a scroll bar 3110 corresponding to the entire document images scanned in high-volume document mode, near the 3D preview display (e.g., at top, bottom, left or right relative to the 3D preview display). In FIG. 16, scroll bar 3110 is displayed at the bottom of the 3D preview display. Scroll bar 3110 can indicate a relative position of the currently preview image, among the entire document images scanned in high-volume document mode. It is also possible, by pointing a position on scroll bar 3110, to present preview display of a document image corresponding to that position. Further, color of scroll bar 3110 corresponding to each of sections ST11, ST12, ST13, ST14 . . . may be changed from the others.

Example 2

Example 2 shows a case where image output conditions are reconfigured by inserting section breaks at the time of editing the image output after document reading.

Figure 17:
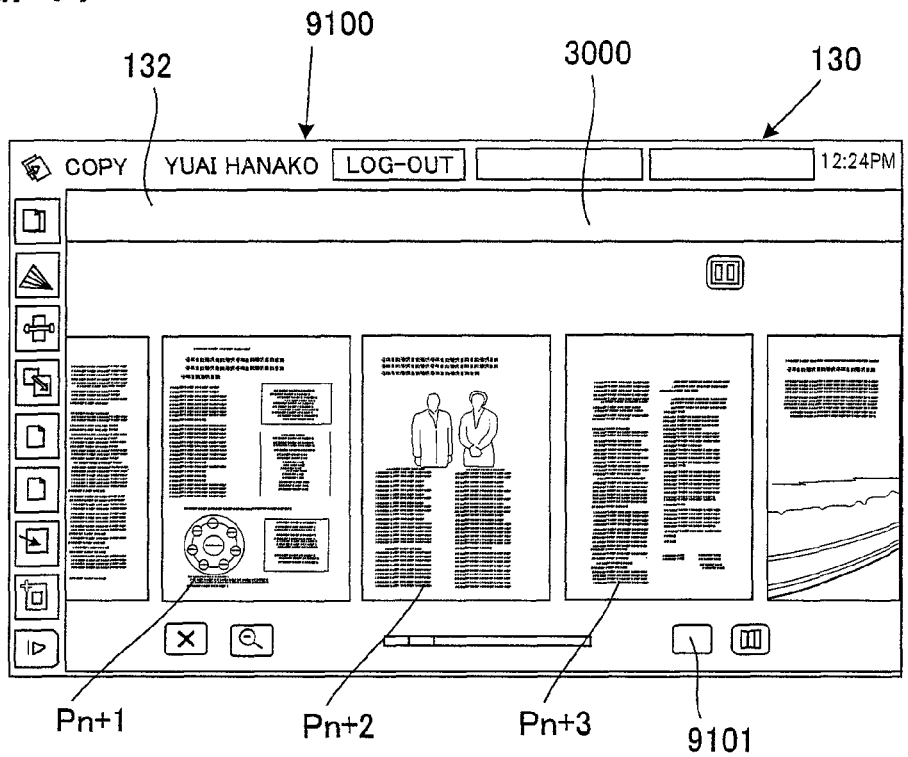
FIG. 17 is an illustrative view showing an edit screen in an image forming apparatus of example 2.
Figure 18:
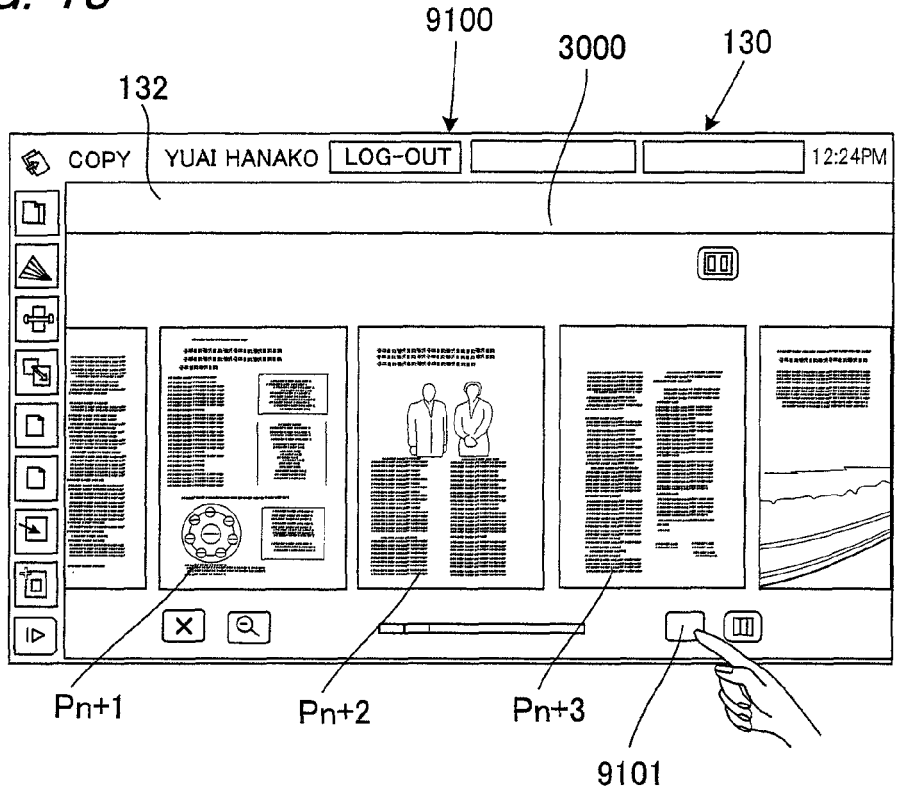
FIG. 18 is an illustrative view showing an operating state when a section break starts to be set on the edit screen.
Figure 19:
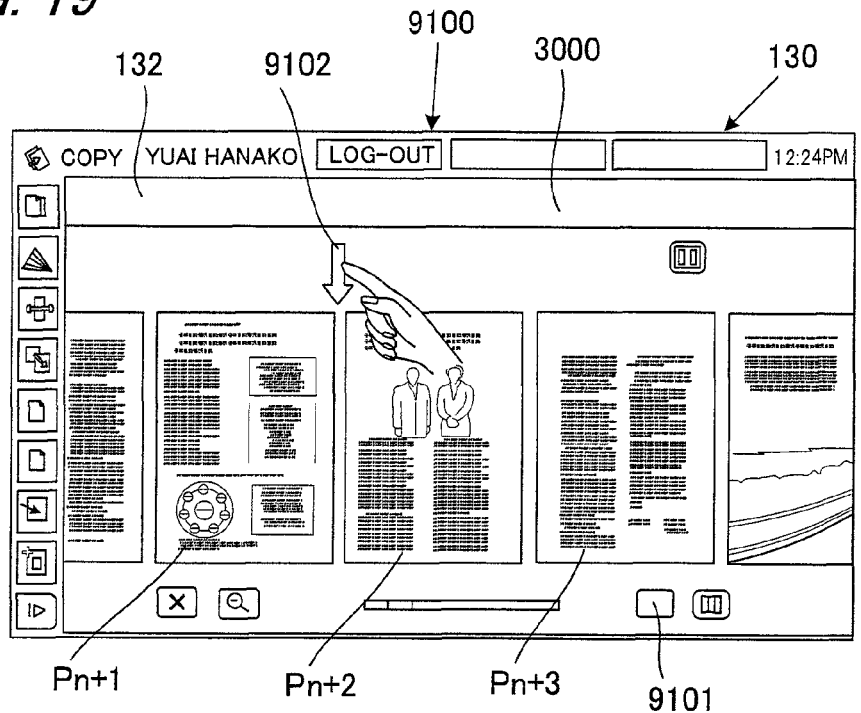
FIG. 19 is an illustrative view showing one operational example of setting a section break on the edit screen; and, FIG. 20 is an illustrative view showing another operational example of setting section breaks on the edit screen.
Figure 20:
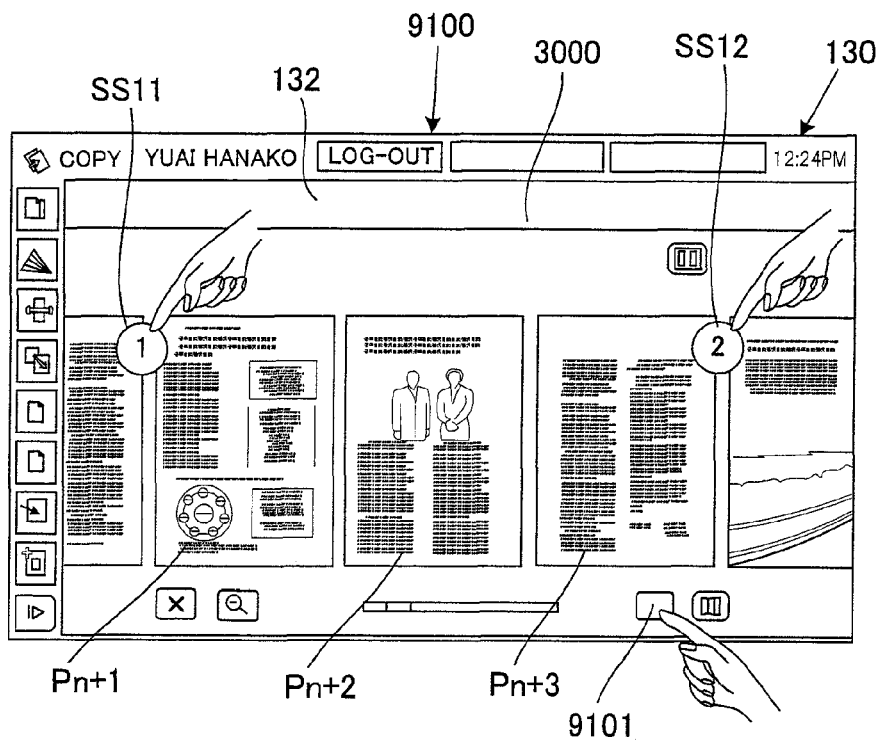

FIG. 17 is an illustrative view showing an edit screen in an image forming apparatus of example 2. FIG. 18 is an illustrative view showing an operating state when setup of section breaks is started on the edit screen. FIG. 19 is an illustrative view showing one operational example of inserting a section break on the edit screen. FIG. 20 is an illustrative view showing another operational example of inserting section breaks on the edit screen.

In image forming apparatus 100, when the images output based on the image data captured by document reader 102, are edited, edition of output images is carried out as shown in FIG. 17, by performing screen touch control on an edit screen 9100 displayed in the enlarged preview region 3000 on touch panel display 130 so as to insert section breaks in a multiple number of display images (image sequence) Pn+1, Pn+2, Pn+3, . . . given in preview representation and change the settings of the image output conditions for each of the generated sections.

When the output images are edited on touch panel display 130, edit screen 9100 is displayed in the enlarged preview region 3000 in touch panel display 130 so that a plurality of display images Pn+1, Pn+2, Pn+3, . . . based on image data are laid out in preview representation from left to right in a scrollable manner, as shown in FIG. 17.

Under the preview region 3000, a section insert command button 9101 is displayed as a section break setter 1314. When section insert command button 9101 is touched as shown in FIG. 18, an arrow (indicator) 9102 that designates a section insert position is displayed on edit screen 9100, as shown in FIG. 19.

When a section break is set in the image array of multiple display images Pn+1, Pn+2, Pn+3, . . . presented in preview representation, arrow 9102 is touched and moved to a position to which a section break is to be inserted, so as to determine the inserted position and thereby set a section break. The inserted position may be determined by, for example, operating section insert command button 9101 as a determination button.

In the above way, it is possible to create sections for which image output conditions can be set up, by inserting section breaks into multiple display images presented in preview representation. Since it is possible to change the image output conditions for each of the generated sections, a desired image output can be realized.

As another example, as shown in FIG. 20 section brakes SS11 and SS12 may be inserted by directly touching the section insert positions on edit screen 9100 after touching section insert command button 9101 that functions as section break setter 1314.

As described heretofore, in image forming apparatus 100 of the present embodiment, control unit-side controller 131 includes function setup controller 1312 having the function of setting up image output conditions for images to be output from image output unit 107. Further, component of function setup controller 1312 includes high-volume document mode setter 1313 as well as section break setter 1314, section support image output condition storage 1315 and section support image output unit 1316. With this arrangement, it is possible to divide document sheaves consisting of multiple pages into sections, store the settings of image output conditions for each section and implement a process with the settings. This configuration makes it possible to perform complex combinations of processes in image output, hence it is possible to realize a document finish that the user is aiming at.

Since function setup controller 1312 further includes section break canceller 1317 capable of canceling a set section break arbitrarily, it is possible to easily change the settings when the user wants to change the range of a section, when the user wants to reconfigure the image output conditions all at once, or in any other case. For example, when image output conditions are reconfigured, it is possible to set up new conditions for the entire image data all at once by canceling all the section breaks.

Moreover, according to the present embodiment, since function setup controller 1312 includes finishing process setter 1318 for setting up a finishing process such as stapling/punching, page allocation, etc., after image output, it is possible to perform the same setup for multiple sections when the user sets up the finishing process.

The above embodiment and examples were described taking cases in which control unit 120 is applied to image forming apparatus 100 shown in FIG. 1. However, as long as it is an image forming apparatus that can perform additional reading (additional input) of image data and includes a control unit capable of displaying document images in preview representation on a display panel or the like before printing, the invention can be developed to any other image forming apparatus and the like, not limited to the image forming apparatus and copier having the configuration described above.

Though the above embodiment and examples were described taking cases where each document sheaf is composed of multiple documents, it goes without saying that the invention includes a case where each document sheaf is composed of a single document, not limited to this configuration.

Having described heretofore, the present invention is not limited to the above embodiment and examples, various changes can be made within the scope of the appended claims. That is, it is apparent that various kinds of variations and modified examples will occur to those skilled in the art within the scope of the appended claims. That is, any embodied mode obtained by combination of technical means modified as appropriate without departing from the spirit and scope of the present invention should be included in the technical art of the present invention.

What is claimed is:

1. An image forming apparatus comprising:
   an input unit having a function of receiving additional input of image data;
   a storing unit storing the image data input from the input unit;
   an output unit for performing image output based on the image data stored in storing unit; and,
   an image display control device,
   characterized in that
   the image display control device includes:
   a function setup controller having a function of setting up image output conditions of an image to be output from the output unit;
   a display image generator generating a display image based on the image data stored in the storing unit;
   a display unit having a display screen for displaying the display image generated by the display image generator; and
   a display controller having a function of displaying the display image on the display unit in preview representation, the function setup controller includes:

an image data sheaf forming function of forming a plurality of image data sheaves by additionally reading respective additional inputs of image data;

a section break setup function that, when the image data is additionally read, sets up a section break for creating a section to distinguish the additional input image data to be additionally input, from precedent image data that has been input already;

an image output condition storing function for storing image output conditions set for each of the sections; and, an image output executing function of performing image output in accordance with the setup of image output conditions for each section, and wherein the section break setup function includes a section position setup function for setting up the section break at an arbitrary position in the array of image data stored in the order of input.

2. The image forming apparatus according to claim 1, wherein the function setup controller includes an intra-section image output condition reconfiguring function of enabling setup change of the image output conditions that have been set at an arbitrary position in the array of image data inside a section divided by the section breaks, and an intra-section reconfiguration validating function of making the setup change of image output conditions effective inside the whole section.

3. The image forming apparatus according to claim 1, wherein the function setup controller enables all the functions which the function setup controller has, to be set up when the image output conditions are specified.

4. The image forming apparatus according to claim 1, wherein the function setup controller includes a section break canceling function capable of canceling a section break arbitrarily.

5. The image forming apparatus according to claim 1, wherein the function setup controller includes a finishing process setup function of setting up a finishing process, and the finishing process can be specified with the same settings for multiple sections.

6. An image forming apparatus comprising:

an input unit having a function of receiving additional input of image data;

a storing unit storing the image data input from the input unit;

an output unit for performing image output based on the image data stored in storing unit; and, an image display control device, characterized in that the image display control device includes:

a function setup controller having a function of setting up image output conditions of an image to be output from the output unit;

a display image generator generating a display image based on the image data stored in the storing unit;

a display unit having a display screen for displaying the display image generated by the display image generator; and a display controller having a function of displaying the display image on the display unit in preview representation, the function setup controller includes:

an image data sheaf forming function of forming a plurality of image data sheaves by additionally reading respective additional inputs of image data;

a section break setup function that, when the image data is additionally read, sets up a section break for creating a section to distinguish the additional input image data to be additionally input, from precedent image data that has been input already;

an image output condition storing function for storing image output conditions set for each of the sections; and, an image output executing function of performing image output in accordance with the setup of image output conditions for each section, and wherein the section break setup function includes a section timing setup function for setting up the section break so that the section break may be executed at an arbitrary timing when the image data is additionally input.

\* \* \* \* \*